US012780419B2

(12) United States Patent
Vanhoy

(10) Patent No.: US 12,780,419 B2
(45) Date of Patent: Nov. 3, 2026

(54) REDUNDANT RAIL COVER ASSEMBLY WITH FAILURE INDICATORS

(71) Applicant: B/E Aerospace, Inc., Winston-Salem, NC (US)

(72) Inventor: Mark Vanhoy, Hamptonville, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 556 days.

(21) Appl. No.: 18/376,720

(22) Filed: Oct. 4, 2023

(65) Prior Publication Data

US 2025/0115359 A1 Apr. 10, 2025

(51) Int. Cl.
*B64D 11/06* (2006.01)

(52) U.S. Cl.
CPC ................................ *B64D 11/0606* (2014.12)

(58) Field of Classification Search
CPC . B64C 1/1438; B64C 1/1407; B64D 11/0606; B64D 11/0023; E05D 15/0665; E05D 15/063
See application file for complete search history.

(56) References Cited

U.S. PATENT DOCUMENTS 11,084,587 B2 * 8/2021 Robinson .............. B64C 1/1423
11,708,162 B2 7/2023 Ivanov et al.
11,905,020 B2 * 2/2024 Scotford ............ B64D 11/0606
12,234,017 B2 * 2/2025 Davis .................. E05D 15/0686
12,330,788 B2 * 6/2025 Warwick ............... B64C 1/1438
2019/0329891 A1 10/2019 Bonnefoy et al.
2021/0179254 A1 * 6/2021 Scotford ............... B64C 1/1438
2022/0332423 A1 10/2022 Thomas et al.
2022/0396986 A1 12/2022 Wills
2022/0402609 A1 12/2022 Warwick et al.
2022/0402612 A1 * 12/2022 Davis ................. B64D 11/0023
2025/0341124 A1 * 11/2025 Vanhoy .............. B64D 11/0606

FOREIGN PATENT DOCUMENTS

WO 2021084474 A1 5/2021

OTHER PUBLICATIONS

European Extended Search Report received in EP Application No. 24204365.1, Feb. 11, 2025, 8 pages.

* cited by examiner

*Primary Examiner* — Daniel J Troy
*Assistant Examiner* — Susan M. Heschel
(74) *Attorney, Agent, or Firm* — Suiter Swantz IP

(57) ABSTRACT

A redundant rail cover and indicator system may include one or more rail and carriage failure indicator assemblies. Each assembly may include a failure indicator configured to identify when a primary sub-assembly fails and a rotational sub-assembly configured to rotate the failure indicator between a stowed and deployed position. When the primary sub-assembly fails, the rotational sub-assembly may be configured to cause the failure indicator to rotate between the stowed and deployed position. Each redundant rail cover assembly may include an actuatable cover and a cover actuation sub-assembly configured to actuate the cover between a stowed and deployed position. When in the stowed position, the cover may be configured to substantially cover the secondary rail. When the primary sub-assembly fails, the cover actuation sub-assembly may be configured to cause the cover to actuate between the stowed and deployed position.

15 Claims, 21 Drawing Sheets

REDUNDANT RAIL COVER ASSEMBLY WITH FAILURE INDICATORS

BACKGROUND

Aircraft cabin designs may include passenger suites. A particular passenger suite may include a door to separate the passenger suite from other areas in the aircraft cabin (e.g., an aisle, an adjacent passenger suite, or the like). In the event that the door mechanism fails, there is a need for passengers to egress from the suite, in accordance with aviation guidelines and standards.

SUMMARY

An actuatable door for an aircraft passenger suite installed within an aircraft cabin is disclosed, in accordance with one or more embodiments of the present disclosure. In embodiments, the actuatable door includes one or more redundant rail and carriage assemblies coupled to a portion of the actuatable door, where the one or more redundant rail and carriage assemblies includes a primary rail and carriage sub-assembly including a primary rail and a primary carriage and a secondary rail and carriage sub-assembly including a secondary rail and a secondary carriage, the secondary rail being different than the primary rail, the secondary carriage being different than the primary carriage, the secondary rail and carriage sub-assembly being configured to actuate the actuatable door via the secondary rail and the secondary carriage if one of the primary rail or the primary carriage of the primary rail and carriage sub-assembly fails. In embodiments, the actuatable door includes one or more rail and carriage failure indicator assemblies. In embodiments, each rail and carriage indicator assembly includes a failure indicator configured to visually identify when the primary rail and carriage sub-assembly fails. In embodiments, each rail and carriage indicator assembly includes a rotational sub-assembly configured to rotate the failure indicator between one of a stowed indicator position and a deployed indicator position. In embodiments, when the primary rail and carriage sub-assembly fails, the rotational sub-assembly is configured to cause the failure indicator to rotate between the stowed indicator position and the deployed indicator position. In embodiments, the actuatable door includes one or more redundant rail cover assemblies. In embodiments, each redundant rail cover assembly corresponds to the secondary rail and carriage sub-assembly. In embodiments, each redundant rail cover assembly includes an actuatable redundant rail cover. In embodiments, each redundant rail cover assembly includes a cover actuation sub-assembly configured to actuate the actuatable redundant rail cover between one of a stowed cover position and a deployed cover position. In embodiments, when in the stowed cover position, the actuatable redundant rail cover configured to substantially cover the secondary rail of the secondary rail and carriage sub-assembly. In embodiments, when the primary rail and carriage sub-assembly fails, the cover actuation sub-assembly is configured to cause the actuatable redundant rail cover to actuate between the stowed cover position and the deployed cover position.

In some embodiments, the one or more redundant rail and carriage assemblies may include a top primary rail and carriage sub-assembly coupled to a top portion of the actuatable door, a bottom primary rail and carriage sub-assembly coupled to a bottom portion of the actuatable door, a top secondary rail and carriage sub-assembly coupled to the top portion of the actuatable door, and a bottom secondary rail and carriage sub-assembly coupled to the bottom portion of the actuatable door.

In some embodiments, the one or more rail and carriage failure indicator assemblies may include a first indicator associated with the top primary rail and carriage sub-assembly and the top secondary rail and carriage sub-assembly, wherein the first indicator is rotated between the stowed indicator position and the deployed indicator position when one of the primary rail or the primary carriage of the top primary rail and carriage sub-assembly fails; and a second indicator associated with the bottom primary rail and carriage sub-assembly and the bottom secondary rail and carriage sub-assembly, wherein the second indicator is rotated between the stowed indicator position and the deployed indicator position when one of the primary rail or the primary carriage of the bottom primary rail and carriage sub-assembly fails.

In some embodiments, the rotational sub-assembly of the rail and carriage failure indicator assembly may include a lever configured to couple the failure indicator to the actuatable redundant rail cover.

In some embodiments, the rotational sub-assembly of the rail and carriage failure indicator assembly may include a spring and a pin, where the failure indicator may rotate about an axis of the pin when rotating between the stowed indicator position and the deployed indicator position.

In some embodiments, the cover actuation sub-assembly of the redundant rail cover assembly may include a cover arm and a carriage plate.

In some embodiments, the cover arm may include a protrusion configured to engage with a slot of the carriage plate, where upon one of the one of the primary rail or the primary carriage failing, the protrusion of the cover arm may be configured to disengage from the slot of the carriage plate.

In some embodiments, the cover actuation sub-assembly of the redundant rail cover assembly may further include one or more cover rails.

In some embodiments, upon the protrusion of the cover arm disengaging from the slot of the carriage plate, the cover arm may be configured to rotate to cause the cover to translate via the one or more cover rails.

In some embodiments, the cover actuation sub-assembly of the redundant rail cover assembly may further include one or more magnets and one or more magnetic plates, where a magnetic force of the one or more magnets and the one or more magnetic plates may be configured to be overcome upon a force applied to the actuatable door when actuating the actuatable door between one of the stowed position and the deployed position.

A redundant rail cover and indicator system is disclosed, in accordance with one or more embodiments of the present disclosure. In embodiments, the system includes one or more rail and carriage failure indicator assemblies. In embodiments, each rail and carriage indicator assembly includes a failure indicator configured to visually identify when the primary rail and carriage sub-assembly fails. In embodiments, each rail and carriage indicator assembly includes a rotational sub-assembly configured to rotate the failure indicator between one of a stowed indicator position and a deployed indicator position. In embodiments, when the primary rail and carriage sub-assembly fails, the rotational sub-assembly is configured to cause the failure indicator to rotate between the stowed indicator position and the deployed indicator position. In embodiments, the system includes one or more redundant rail cover assemblies. In embodiments, each redundant rail cover assembly corresponds to the secondary rail and carriage sub-assembly. In embodiments, each redundant rail cover assembly includes an actuatable redundant rail cover. In embodiments, each redundant rail cover assembly includes a cover actuation sub-assembly configured to actuate the actuatable redundant rail cover between one of a stowed cover position and a deployed cover position. In embodiments, when in the stowed cover position, the actuatable redundant rail cover configured to substantially cover the secondary rail of the secondary rail and carriage sub-assembly. In embodiments, when the primary rail and carriage sub-assembly fails, the cover actuation sub-assembly is configured to cause the actuatable redundant rail cover to actuate between the stowed cover position and the deployed cover position.

In some embodiments, the rotational sub-assembly of the rail and carriage failure indicator assembly may include a spring and a pin, where the failure indicator may rotate about an axis of the pin when rotating between the stowed indicator position and the deployed indicator position.

In some embodiments, the cover actuation sub-assembly of the redundant rail cover assembly may include a cover arm and a carriage plate, where the cover arm may include a protrusion configured to engage with a slot of the carriage plate, where upon one of the one of the primary rail or the primary carriage failing, the protrusion of the cover arm may be configured to disengage from the slot of the carriage plate.

In some embodiments, the cover actuation sub-assembly of the redundant rail cover assembly may further include one or more cover rails, where upon the protrusion of the cover arm disengaging from the slot of the carriage plate, the cover arm may be configured to rotate to cause the cover to translate via the one or more cover rails.

In some embodiments, the rotational sub-assembly of the rail and carriage failure indicator assembly may include a lever configured to couple to the failure indicator to the actuatable redundant rail cover, where upon the cover translating via the one or more cover rails between one of the stowed cover position and the deployed cover position, the lever may be configured to translate to cause the failure indicator to rotate between one of the stowed indicator position and the deployed indicator position.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1:
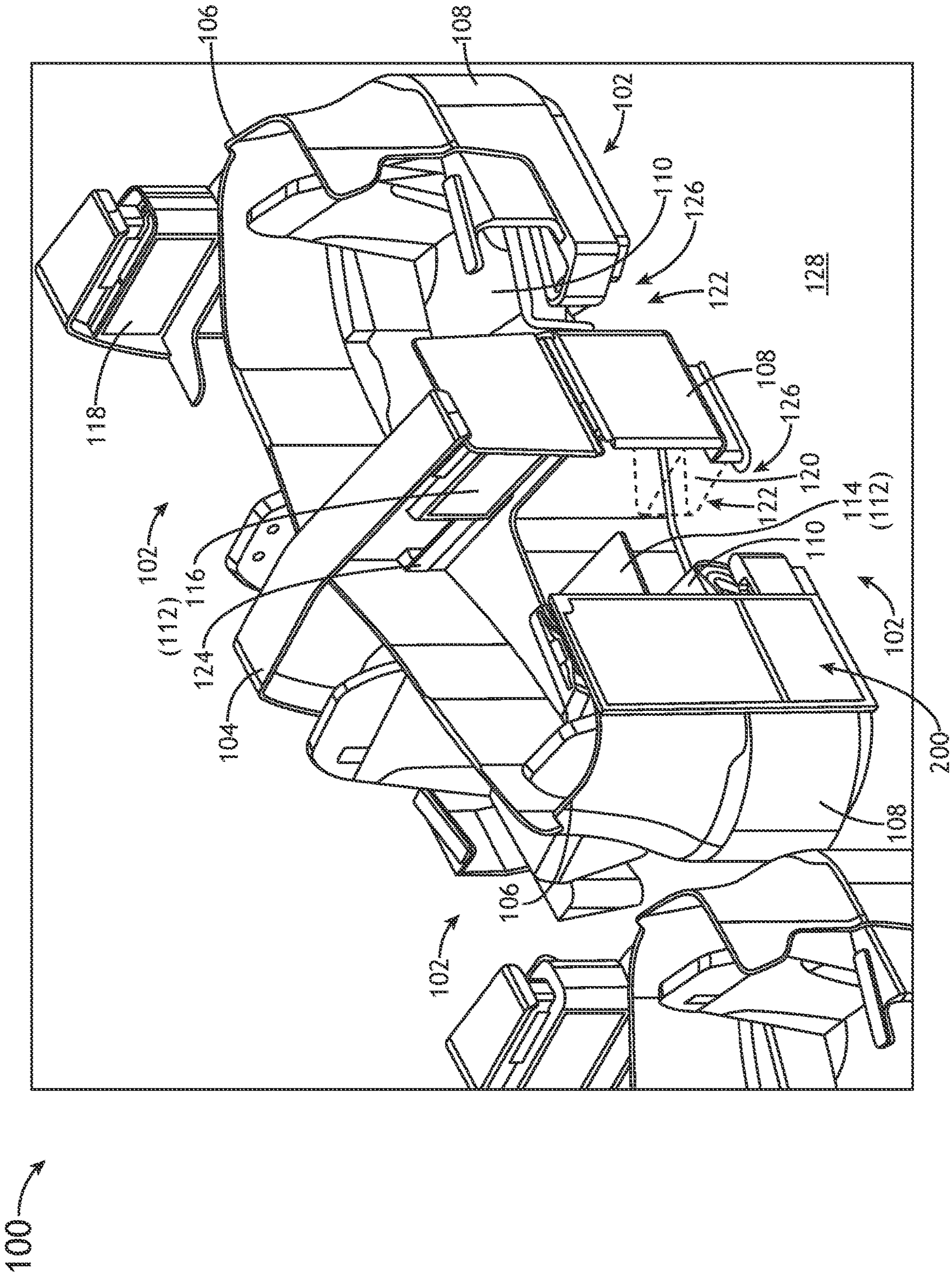
FIG. 1 is a simplified schematic of an aircraft cabin with a passenger suite including an actuatable door, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one," "one or more," or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1-5E in general illustrate a redundant rail cover rand indicator assembly, in accordance with one or more embodiments of the disclosure.

Aircraft cabin designs may include passenger suites. A particular passenger suite may include a door to separate the passenger suite from other areas in the aircraft cabin (e.g., an aisle, an adjacent passenger suite, or the like). The separation of the passenger suite from other areas in the aircraft cabin may provide privacy to an occupant within the passenger suite when the door is closed. When the door is open, an opening within the passenger suite may be configured to allow for access to the passenger suite from an open area within the aircraft cabin (or egress from the passenger suite into the open area within the aircraft cabin). When the door is closed, the opening may temporarily prevent egress from the passenger suite into the open area within the aircraft cabin (e.g., preventing egress only to the extent such prevention does not inconvenience an occupant or generate an unsafe environment in the event of an emergency).

Aircraft cabin designs need to be certified in accordance with aviation guidelines and standards, while being designed so as not to lose the intended functionality of the structures and/or monuments in the aircraft cabin. For example, the structures and/or monuments in the aircraft cabin may need to be configured in accordance with aviation guidelines and/or standards put forth by, but not limited to, the Federal Aviation Administration (FAA), the European Aviation Safety Agency (EASA), or any other flight certification agency or organization; or any other guidelines agency or organization; or the like.

During select stages of flight (e.g., taxi, takeoff, and landing), the door must be in an open position to allow a passenger to egress from the passenger suite in the event of an emergency, as required by aviation guidelines and standards. Additionally, the door must include an emergency egress method or system for the passenger to exit their seat in the event that the first means of egress (e.g., the door) is jammed in the deployed position.

In some door systems a single rail door mechanism is used to deploy the door. In such designs, a failure of the primary mechanical system blocks emergency egress from a passenger suite, which thus requires utilizing complex backup mechanisms that allow the passenger to escape. However, these escape mechanisms require the passenger to assess their situation, follow placarded instructions, and then use the escape mechanism (e.g., a pull lever that disengages the door from the deployment mechanism).

Further, in some door systems a redundant rail and carriage assembly is used to deploy the door. In such design, a redundant mechanism (or secondary mechanism) may be used to deploy the door in the event that the primary mechanism fails. Redundant and carriage assemblies for actuatable doors are generally discussed in U.S. Patent Publication No. 2022/0402612, published on Dec. 22, 2022, which is incorporated herein by reference in the entirety.

One drawback of a redundant rail and carriage assembly is that the secondary mechanism is visible to the passenger which may allow the passenger to tamper with the assembly. As such, it may be desirable to cover such mechanism, however, covering the secondary mechanism is difficult because the cover must be moved during operation to expose the secondary rail before it can operate.

As such, it would be desirable to provide a redundant rail cover assembly with failure indicators for an actuatable door for an aircraft passenger suite. The redundant rail cover and indicator assembly should visually identify when the primary mechanism has failed. Further, where the actuatable door includes a top and bottom rail system, the redundant rail cover and indicator assembly should visually identify which system has failed (e.g., the top, bottom, or both). The redundant rail cover and indicator assembly should not impede the operation of the secondary rail in the event that the primary rail fails. For example, the assembly may include an actuatable cover mechanism configured to be moved during operation to expose the secondary rail, such that the actuatable cover mechanism does not impede the secondary rail from operating in the event that the primary rail fails.

FIG. 1 illustrates an aircraft cabin 100 and one or more passenger suites 102, in accordance with one or more embodiments of the disclosure.

Where there are multiple passenger suites 102, the multiple passenger suites 102 may be separated by a bridge 104. The bridge 104 may define at least a portion of each of the multiple passenger suites 102. It is noted adjacent passenger suites 102 may be considered as on particular sides of the bridge 104. Where there are multiple passenger suites 102, the multiple passenger suites 102 may be arranged in an inboard/outboard configuration and/or a forward/rearward configuration. It is noted, however, the multiple passenger suites 102 may be arranged in any configuration within the aircraft cabin 100.

The passenger suite 102 may include a suite wall 106 with one or more suite wall elements 108. For example, at least some of the one or more suite wall elements 108 may be a component of a particular suite wall 106 corresponding to a particular passenger suite 102. By way of another example, at least some of the one or more suite wall elements 108 (e.g., to the entirety of a suite wall 106 structure) may be shared between adjacent passenger suites 102.

The bridge 104 and/or the suite wall 106 may be implemented as a divider or structure separating adjacent passenger suites 102 and/or separating a passenger suite 102 from an area within the aircraft cabin 100. For example, where the bridge 104 is implemented as a separator, the bridge 104 may be configured to allow for the multiple passenger suites 102 to be installed within the aircraft cabin 100 in a more compact arrangement. In this regard, the amount of floor area of the aircraft cabin 100 necessary for the one or more aircraft seats 110 may be reduced.

It is noted portions of the suite wall 106 have been cut away or removed for purposes of clarity within FIG. 1.

The one or more passenger suites 102 may include one or more aircraft seats 110 (e.g., business class or first-class passenger seats). It is noted the terms "aircraft seats" and "passenger seats" may be considered equivalent, for purposes of the disclosure.

The one or more aircraft seats 110 may include, but are not limited to, seat pans, seat cushions, legs, support members, actuatable armrests, seatbelts, or the like. The one or more aircraft seats 110 may be attachable to embedded seat tracks located in a floor of the aircraft cabin 100 via conventional track fasteners and/or be couplable to the suite wall 106 (e.g., where the suite wall 106 may be attachable to embedded seat tracks located in the floor of the aircraft cabin 100 via conventional track fasteners).

An aircraft seat 110 may be rotatable about an axis (e.g., swivelable). The aircraft seat 110 may be fully positionable between the outer limits of motion as defined by the moveable components of the aircraft seat 110 and/or one or more auxiliary monuments 112 of the passenger suite 102. It is noted an upright or raised position may be considered a taxi, takeoff, or landing (TTL) position during select stages of flight (though the upright or raised position is not limited to use during the select stages of flight as the TTL position, but also may be used at any point during the flight), for purposes of the present disclosure. In addition, it is noted that any position that does not meet the above-defined requirements of the TTL position may be considered a non-TTL position, for purposes of the present disclosure. Further, it is noted the aircraft seat 110 may be actuatable (e.g., translatable and/or rotatable) from the TTL position to a non-TTL position, and/or vice versa. Further, it is noted the aircraft seat 110 may be capable of a fully upright or raised position, and that the TTL position may have a more reclined seat back cushion and a more angled upward seat pan cushion as compared to the fully upright or raised position. Therefore, the above description should not be interpreted as a limitation on the present disclosure but merely an illustration.

In general, the aircraft seat 110 may be translatable (e.g., trackable or slidable). The aircraft seat 110 may be rotatable about an axis cross-wise through the aircraft seat 110 into a position including, but not limited to, an upright or raised position, one or more lounge or reclined positions, and a lie-flat or bed position. For example, the aircraft seat 110 may transition directly between the upright or raised position and the lie-flat or bed position. By way of another example, it is noted the aircraft seat 110 may transition through one or more lounge or reclined positions between the upright or raised position and the lie-flat or bed position. By way of another example, the aircraft seat 110 may transition into one or more lounge reclined positions in a motion separate from the transition between the upright or raised position and the lie-flat or bed position. Therefore, the above description should not be interpreted as a limitation on the scope of the disclosure but merely an illustration.

The aircraft seat 110 may be configured to avoid contact with the one or more auxiliary monuments 112 when transitioning between positions (e.g., between the upright or raised position and the lie-flat or bed position). It is noted that at least some components (e.g., at least a portion of the bridge 104, the suite wall 106 with suite wall elements 108, the one or more auxiliary monuments 112, or the like) may conform to a portion of an aircraft seat 110. In this regard, the amount of floor area of the aircraft cabin 100 necessary for the one or more aircraft seats 110 may be reduced.

The one or more auxiliary monuments 112 may include, but are not limited to, a structure 114 with a horizontal (or substantially horizontal) surface such as a tray or table, a side stand, or the like. The structure 114 may include a top surface, a bottom surface, and/or one or more side surfaces. For example, a structure 114 may include a single continuous side surface where all corners are rounded. By way of another example, the structure 114 may include up to an N number of side surfaces where the auxiliary monument includes up to an N number of corners. The structure 114 may be actuatable (e.g., may extend a select distance from a stored position to an extended position proximate to a passenger, similar to an aircraft tray table). It is noted, however, that the structure 114 may be fixed in position.

The one or more auxiliary monuments 112 may include, but are not limited to, a structure 116 with a vertical (or substantially vertical) surface such as an actuatable privacy panel of the bridge 104. The structure 116 may be untrimmed or may be covered with trim (e.g., interior or exterior décor panels) matching other trim within the passenger suite 102 (and/or the aircraft cabin 100).

The structure 116 may have an in-flight entertainment (IFE) device 118 attached to its vertical (or substantially vertical) surface. For example, where the structure 116 is actuatable, the IFE device 118 may be actuatable. It is noted the structure 116 may itself be an IFE device 118. In addition, it is noted the IFE device 118 may be coupled to other monuments 112 (e.g., in an actuatable position or a fixed position) within the aircraft cabin 100.

The passenger suite 102 may include an ottoman 120 within a footwell 122. The ottoman 120 may be usable by a passenger in the aircraft seat 110 when the corresponding aircraft seat 110 is in the upright or raised position, the one or more reclined or lounge positions, and/or the lie-flat or bed position. For example, the ottoman 120 may form a portion of a bed surface when the corresponding aircraft seat 110 is in the lie-flat or bed position. The ottoman 120 may be usable by a passenger in an aircraft seat 110 positioned proximate to the passenger suite 102 when the corresponding aircraft seat 110 is in a reclined or lounge position.

The ottoman 120 may be configured to translate and/or rotate about an axis through a sidewall of the ottoman 120 to direct a top surface to a passenger occupying the aircraft seat 110. For example, where the ottoman 120 may be configured to both translate and rotate, the ottoman 120 may be configured to independently rotate and/or translate. By way of another example, where the ottoman 120 may be configured to both translate and rotate, a rotation may prevent further translation until the ottoman 120 is returned to a select position and/or a translation may prevent further rotation until the ottoman 120 is returned to a select position.

One or more dimensions of the footwell 122 may be changed by transitioning the aircraft seat 110 between the upright or raised position, the one or more lounge or reclined positions, and the lie-flat or bed position. It is noted that a portion of the ottoman 120 may be actuatable (e.g., along a set of tracks or linear rails) to a position outside of the footwell 122.

It is noted, however, the aircraft seat 110 and/or the ottoman 120 may be limited to an upright or raised position and/or one or more lounge or reclined positions. In addition, it is noted the aircraft seat 110 may be the sole component forming a bed when the aircraft seat 110 is in a lie-flat or bed position. Therefore, the above description should not be interpreted as a limitation on the present disclosure, but merely an illustration.

The passenger suite 102 may include one or more storage compartments 124. The one or more storage compartments 124 may be positioned proximate to or integrated within the bridge 104 and/or the suite wall 106 of the passenger suite 102. The one or more storage compartments 124 may be coupled to and/or at least be partially inset in the one or more auxiliary monuments 112 (e.g., the structure 114, the structure 116, or the like), the ottoman 120, or the like.

At least some of the one or more storage compartments 124 may be configured to receive and hold (e.g., contain, secure, or the like) one or more passenger amenities including, but not limited to, paper-printed materials (e.g., magazines, newspapers, pamphlets, or the like), select personal electronic devices (e.g., phones, tablets, phablets, laptops, music devices, digital video disc (DVD) players, handheld gaming consoles or devices, or the like), food products, drink products, or the like.

At least some of the one or more storage compartments 124 may include one or more electronic connections for one or more passenger amenities such as, but not limited to, one or more charging ports, one or more charging cables, or the like.

At least some of the one or more storage compartments 124 may include one or more electronic connections in communication with one or more components of the passenger suite 102 such as, but not limited to, one or more display device connection ports, one or more display device connection cables, one or more audio output jacks (e.g., headphone jacks), one or more audio input jacks, or the like. At least some of the one or more storage compartments 124 may include one or more safety devices (e.g., air masks, personal floatation devices, or the like).

At least some of the one or more storage compartments 124 may include a storage compartment (e.g., a wardrobe) configured to receive long and/or large items (e.g., passenger amenities needing to be hung, carry-on luggage, or the like) that require an increased space and/or that a passenger may prefer to store in a substantially vertical or upright orientation.

A cavity may be defined within the one or more storage compartments 124. One or more shelves may be installed within the cavity. At least some of the one or more storage compartments 124 may include a corresponding door. For example, a door may be fully-opaque or solid. By way of another example, a door may be at least partially fabricated from a transparent material (e.g., glass, plastic, or the like) or include a patterned or unpatterned set of cut-outs configured or designed to meet aviation guidelines and/or standards.

The passenger suite 102 may include one or more accessories. For example, the one or more lights and/or the one or more vents may be coupled to and/or partially inset in the one or more suite wall elements 108 of the suite wall 106, the bridge 104, or other locations within the passenger suite 102. By way of another example, the one or more accessories may include one or more electronics or electronic devices. For instance, the one or more accessories may include, but are not limited to, the one or more IFE devices 118, one or more speakers configured to provide media content separate from the media content shown on the one or more IFE devices 118 and/or accompanying the media content shown on the one or more IFE devices 118, one or more lights or lighted panels, one or more ventilation devices, one or more aircraft seat 110 actuation devices (e.g., assemblies, controls, actuators, and/or the like), one or more air flow or temperature control devices, one or more visual and/or auditory output control devices, or the like.

The suite wall 106 may include an opening 126 within the one or more suite wall elements 108 into the passenger suite 102. The opening 126 may allow for access to the passenger suite 102 from an aircraft aisle 128 within the aircraft cabin 100.

FIGS. 2A-4D illustrate an actuatable door 200 including the redundant rail cover and indicator assembly 300, in accordance with one or more embodiments of the present disclosure. In particular, FIGS. 2A-2E illustrate an actuatable door 200 including a redundant rail and carriage assembly 202. In particular, FIGS. 3A-4D illustrate the redundant rail cover and indicator assembly 300 of the actuatable door 200.

Figure 2A:
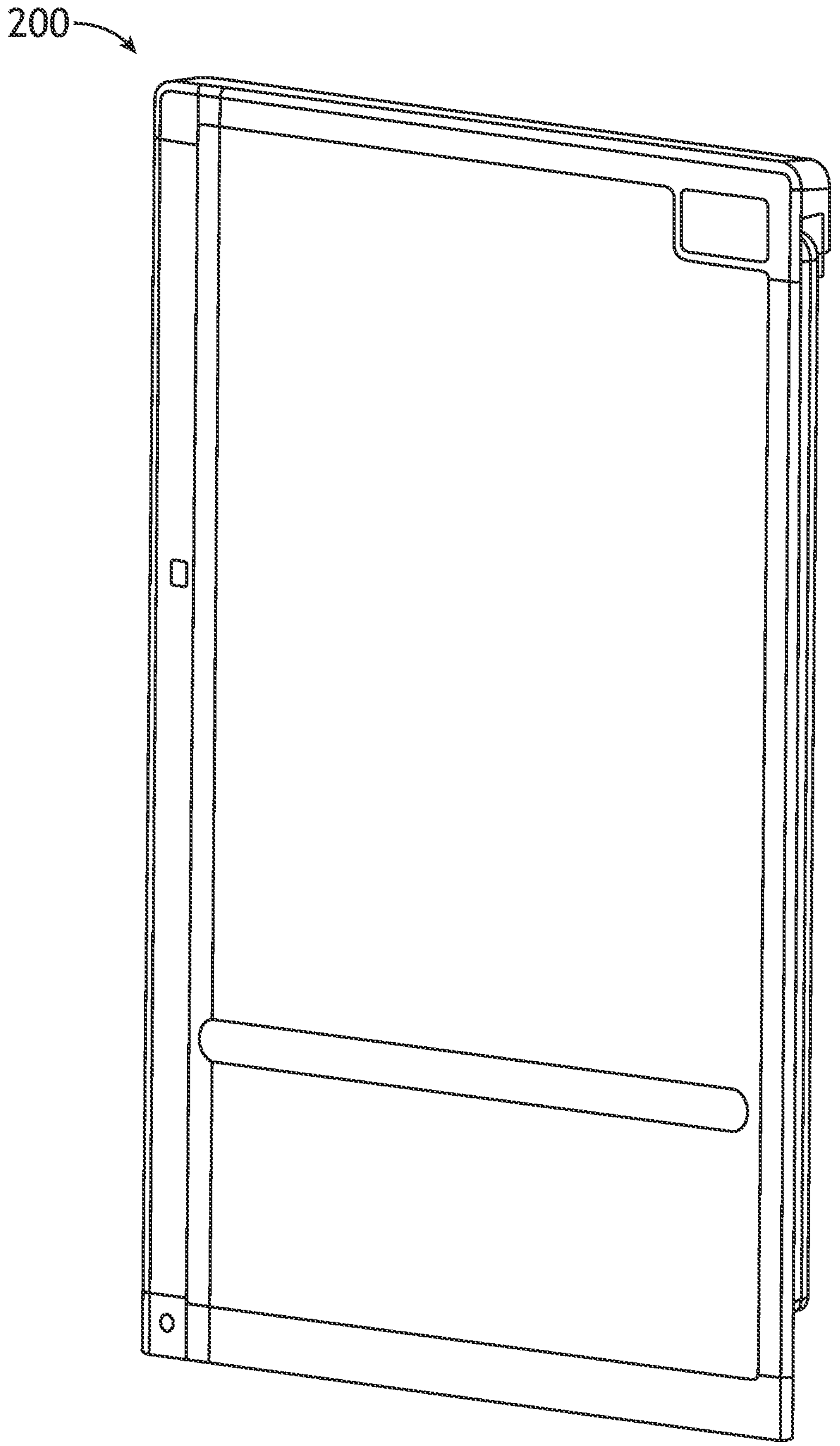
FIG. 2A is a simplified schematic front view of an actuatable door including a redundant rail cover and indicator assembly with a redundant rail and carriage sub-assembly, in accordance with one or more embodiments of the disclosure.
Figure 2B:
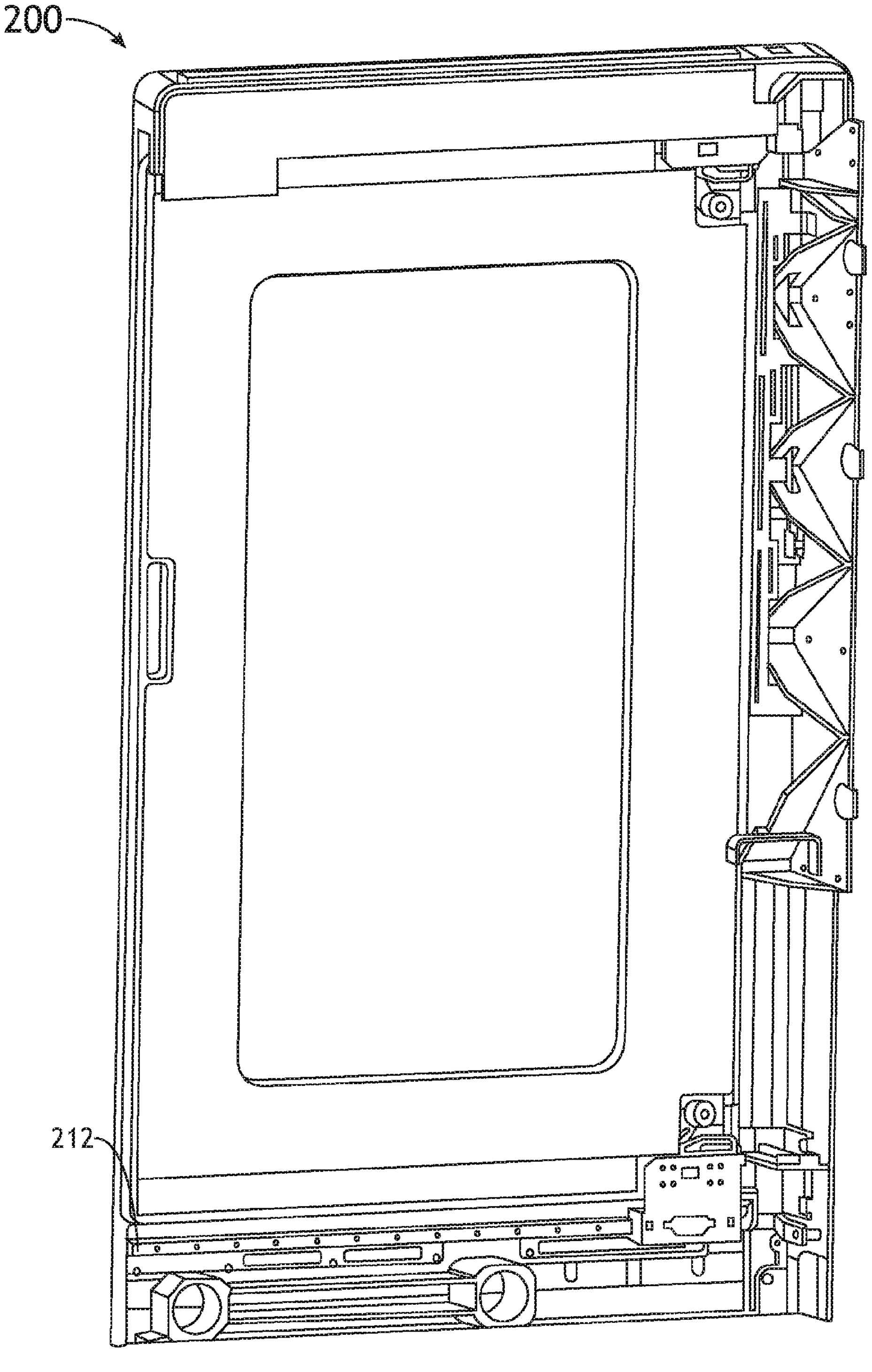
FIG. 2B is a simplified schematic rear view of an actuatable door including a redundant rail cover and indicator assembly with a redundant rail and carriage sub-assembly, in accordance with one or more embodiments of the disclosure.

Referring to FIGS. 2A-2B, the aircraft passenger compartment suite 102 may include one or more actuatable doors 200 for the opening 126. It is noted "actuatable door" and variants including, but not limited to, "door," "actuatable screen," and "screen" may be considered equivalent, for purposes of the disclosure.

The actuatable door 200 may be actuatable between a stowed position, a deployed position, and one or more intermediate positions via the redundant rail and carriage assembly 202. For example, the actuatable door 200 may be in the stowed door position during the TTL phases of flight. By way of another example, the actuatable door 200 may be in the deployed door position during non-TTL phases of flight. It is noted the actuatable door 200 may also be configured for one or more intermediate door positions. For example, the actuatable door 200 may be in a particular intermediate door position during transition between the stowed door position and the deployed door position.

The actuatable door 200 may separate the passenger suite 102 from other areas in the aircraft cabin 100 and may provide privacy to an occupant within the passenger suite 102 when the actuatable door 200 is in the deployed door position. When the actuatable door 200 is in the stowed door position (e.g., is open), the opening 126 within the passenger suite 102 may be configured to allow for access to the passenger suite 102 from an open area (e.g., the aircraft aisle 128, or other open area) within the aircraft cabin 100 (or egress from the passenger suite 102 into the open area within the aircraft cabin 100). When the door 200 is in the stowed door position, the opening 126 may temporarily prevent egress from the passenger suite 102 into the open area within the aircraft cabin 100 (e.g., preventing egress only to the extent such prevention does not inconvenience an occupant or generate an unsafe environment in the event of an emergency).

Figure 2C:
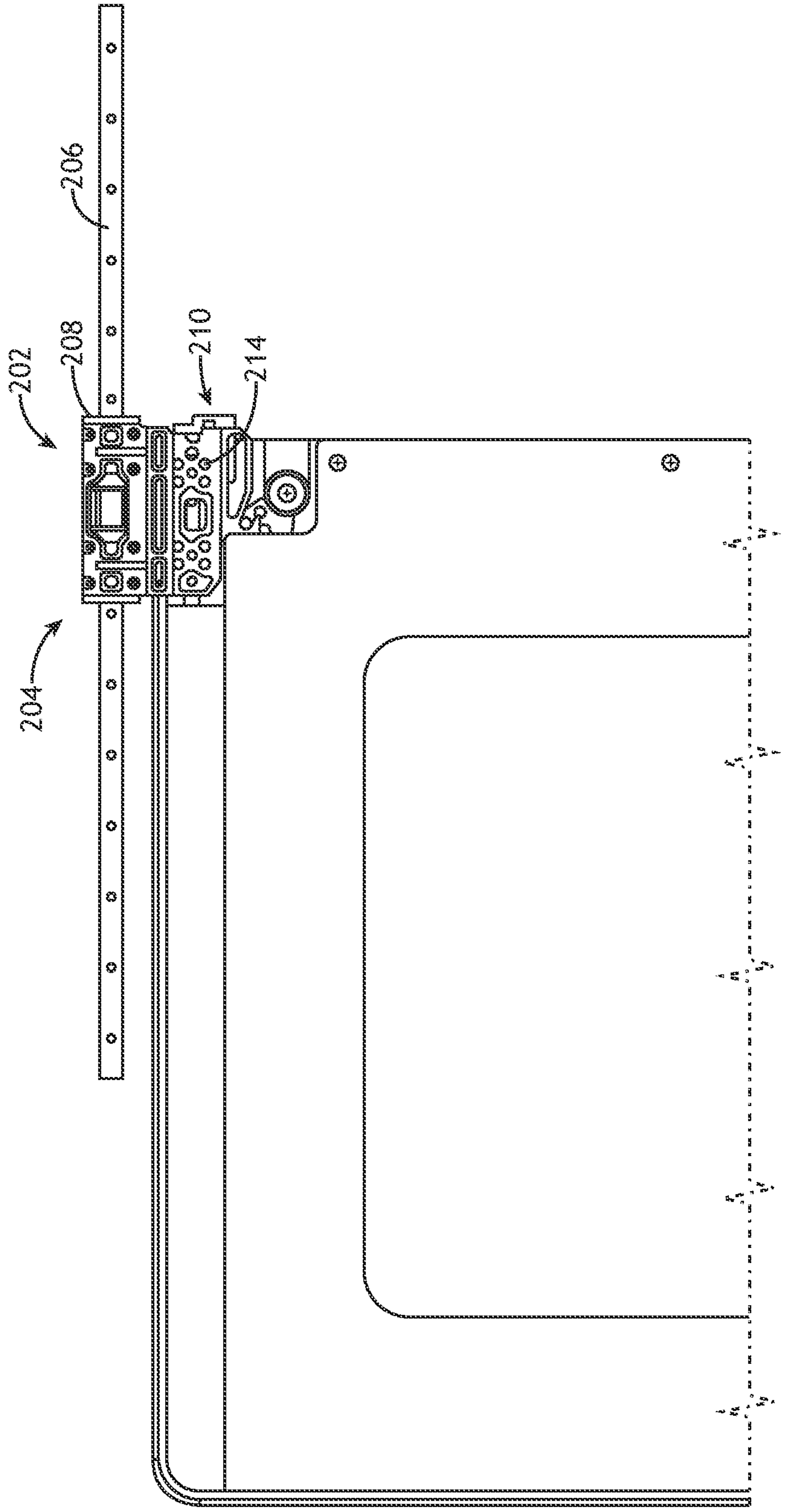
FIG. 2C is a simplified schematic detailed view of an actuatable door including a redundant rail cover and indicator assembly with a redundant rail and carriage sub-assembly, in accordance with one or more embodiments of the disclosure.
Figure 2D:
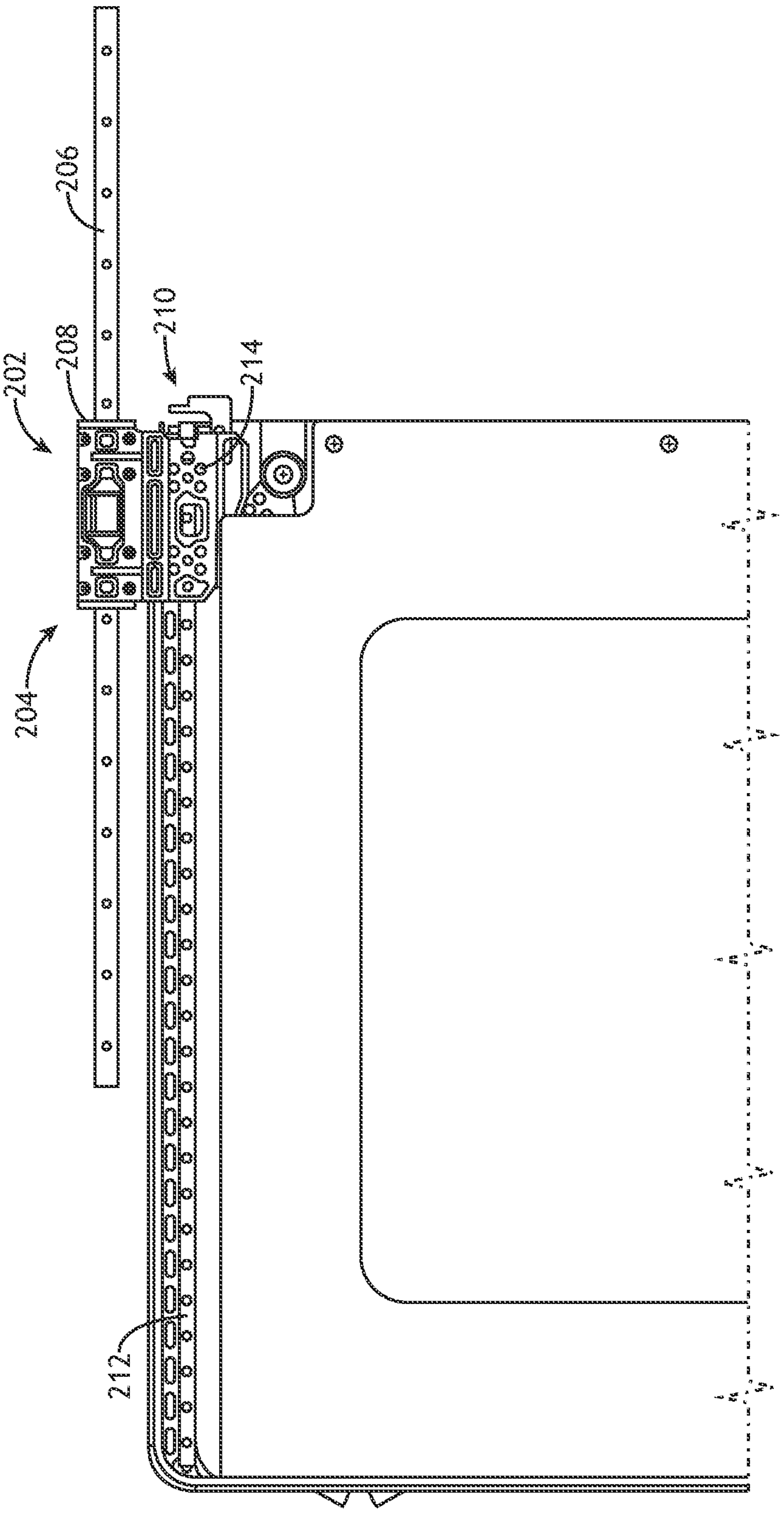
FIG. 2D is a simplified schematic detailed view of an actuatable door including a redundant rail cover and indicator assembly with a redundant rail and carriage sub-assembly, in accordance with one or more embodiments of the disclosure.
Figure 2E:
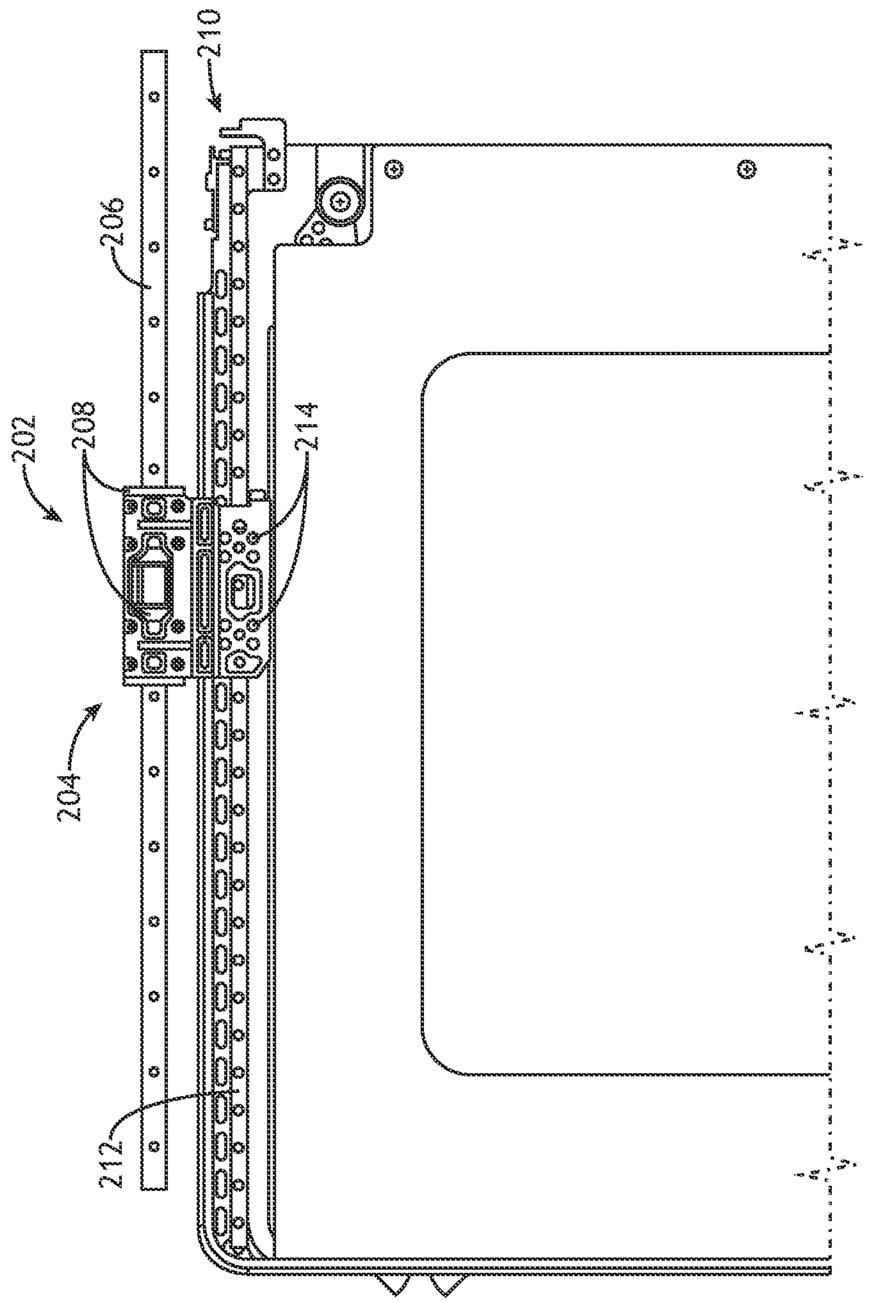
FIG. 2E is a simplified schematic detailed view of an actuatable door including a redundant rail cover and indicator assembly with a redundant rail and carriage sub-assembly, in accordance with one or more embodiments of the disclosure.

Referring to FIGS. 2C-2E, the one or more actuatable doors 200 may include one or more redundant rail and carriage assemblies 202. As previously discussed herein, during select stages of flight (e.g., taxi, takeoff, and landing), the door 200 must be in an open position to allow a passenger to egress from the passenger suite 102 in the event of an emergency, as required by aviation guidelines and standards. The door 200 must include an emergency egress method or system for the passenger to exit their seat 110 in the event that the first means of egress (e.g., the door 200) is jammed in the deployed position.

Each redundant rail and carriage assembly 202 may include a primary rail and carriage sub-assembly 204. For example, each primary rail and carriage sub-assembly 204 may include a primary rail 206 and one or more primary carriages 208. For instance, each primary rail and carriage sub-assembly 204 may include two primary carriages 208, as shown in FIGS. 2C-2E. In another instance, each primary rail and carriage sub-assembly 204 may include a single primary carriage 208. It is noted "primary rail and carriage sub-assembly" and variants including, but not limited to, "primary sub-assembly 204" or "sub-assembly 204" may be considered equivalent, for purposes of the disclosure.

Each redundant rail and carriage assembly 202 may include a secondary rail and carriage sub-assembly 210. For example, each secondary rail and carriage sub-assembly 210 may include a secondary rail 212 and one or more secondary carriages 214. For instance, each secondary rail and carriage sub-assembly 210 may include two secondary carriages 214, as shown in FIGS. 2C-2E. In another instance, each secondary rail and carriage sub-assembly 210 may include a single secondary carriage 214. It is noted "secondary rail and carriage sub-assembly 210" and variants including, but not limited to, "secondary sub-assembly 210" or "sub-assembly 210" may be considered equivalent, for purposes of the disclosure.

It is noted that the one or more sub-assemblies 204, 210 may include any type of carriage known in the art. For example, the one or more sub-assemblies 204, 210 may include one or more slide bearing carriages. By way of another example, the one or more sub-assemblies 204, 210 may include one or more ball bearing carriages. Further, it is noted that the one or more sub-assemblies 204, 210 may include any type of rail known in the art. For example, the one or more sub-assemblies 204, 210 may include one or more linear motion rails.

One of the primary sub-assembly 204 or the secondary sub-assembly 210 may couple to one or more portions the actuatable door 200. For example, the secondary rail 212 of the sub-assembly 210 may couple to one or more portions of the door 200. For instance, a first rail 212 of a first sub-assembly 210 may couple to a top portion of the door 200 and an additional rail 212 of an additional sub-assembly 210 may couple to a bottom portion of the door 200. Continuing with this example, the primary rail 206 of the sub-assembly 204 may couple to one or more portions of the suite wall 106. For instance, a first rail 206 of a first sub-assembly 204 may couple to a top portion of the suite wall 106 and an additional rail 206 of an additional sub-assembly 204 may couple to a bottom portion of the suite wall 106. Continuing with this example, the secondary carriage 214 of the sub-assembly 210 may couple to a top portion of the actuatable door 200 and an additional carriage 214 of an additional sub-assembly 210 may couple to a bottom portion of the actuatable door 200. The primary carriage 208 of the sub-assembly 204 may couple to a top portion of the side wall 106 and an additional carriage 208 of an additional sub-assembly 204 may couple to a bottom portion of the side wall 106.

It is contemplated that the primary sub-assembly 204 may be configured to couple to a portion of the door 200 and the secondary sub-assembly 210 may be configured to couple to a portion of the suite wall 106. For example, the primary rail 206 of the sub-assembly 204 may couple to one or more portions of the door 200. For instance, a first rail 206 of a first sub-assembly 204 may couple to a top portion of the door 200 and an additional rail 206 of an additional sub-assembly 204 may couple to a bottom portion of the door 200. Continuing with this example, the secondary rail 212 of the sub-assembly 210 may couple to one or more portions of the suite wall 106. For instance, a first rail 212 of a first sub-assembly 210 may couple to a top portion of the suite wall 106 and an additional rail 212 of an additional sub-assembly 210 may couple to a bottom portion of the suite wall 106. Further, the secondary carriage 214 of the sub-assembly 210 may couple to a top portion of the side wall 106 and an additional carriage 214 of an additional sub-assembly 210 may couple to a bottom portion of the side wall 106. The primary carriage 208 of the sub-assembly 204 may couple to a top portion of the actuatable door 200 and an additional carriage 208 of an additional sub-assembly 204 may couple to a bottom portion of the actuatable door 200.

The door 200 may be actuatable via the one or more redundant rail and carriage assemblies 202. For example, when the primary sub-assembly 204 is operating properly, the door 200 may be actable via one or more primary sub-assemblies 204. For instance, the door 200 may be actuatable via the primary rail 206 and the one or more primary carriages 208.

By way of another example, when the primary sub-assembly 204 is not operating properly, the door 200 may be actuatable via one or more secondary sub-assemblies 210. For instance, the door 200 may be actuatable via one of the secondary rail 212 or the secondary carriage 214. In this regard, when the primary deployment mechanism (e.g., the primary sub-assembly 204) fails, the secondary deployment mechanism (e.g., the secondary sub-assembly 210) may operate to deploy the door 200 such that the passenger does not know that the primary mechanism has failed. This eliminates the need for a separate emergency egress mechanism and reduces the need for naïve subject testing.

The one or more actuatable doors 200 may include a redundant rail cover and indicator system 300. It is noted "redundant rail cover and indicator system 300" and variants including, but not limited to, "cover and indicator system 300", or "system 300" may be considered equivalent, for purposes of the disclosure.

The redundant rail cover and indicator system 300 may include one or more redundant rail cover assemblies 302 and one or more rail and carriage failure indicator assemblies 304. It is noted "one or more redundant rail cover assemblies 302" and variants including, but not limited to, "rail cover assemblies 302", or "cover assemblies 302" may be considered equivalent, for purposes of the disclosure. Further, it is noted "one or more rail and carriage failure indicator assemblies 304" and variants including, but not limited to, "rail and carriage failure indicator assemblies 304", or "failure indicator assemblies 304" may be considered equivalent, for purposes of the disclosure.

Figure 3A:
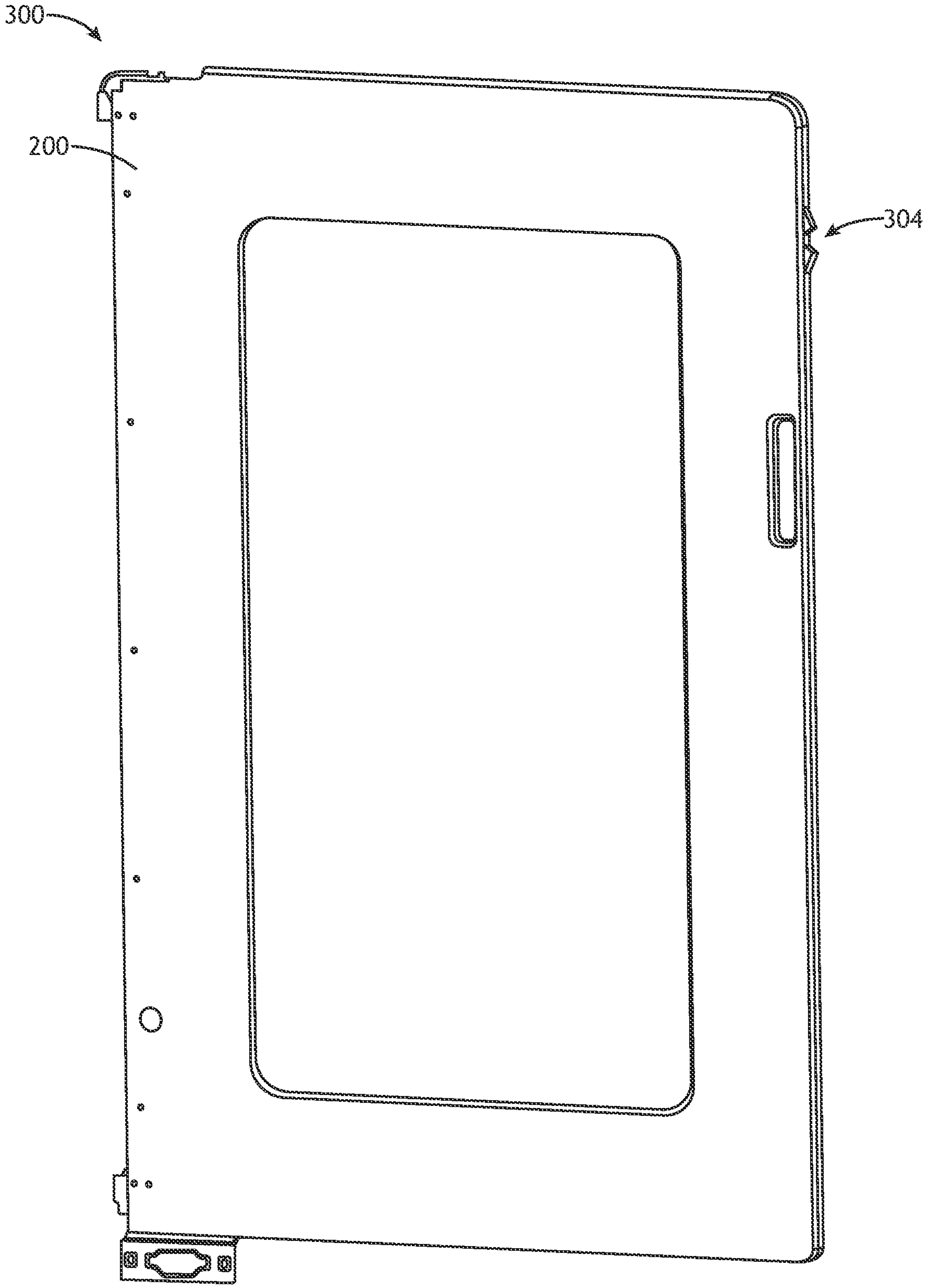
FIG. 3A is a simplified schematic front view of an actuatable door including a redundant rail cover and indicator assembly, in accordance with one or more embodiments of the disclosure.
Figure 3B:
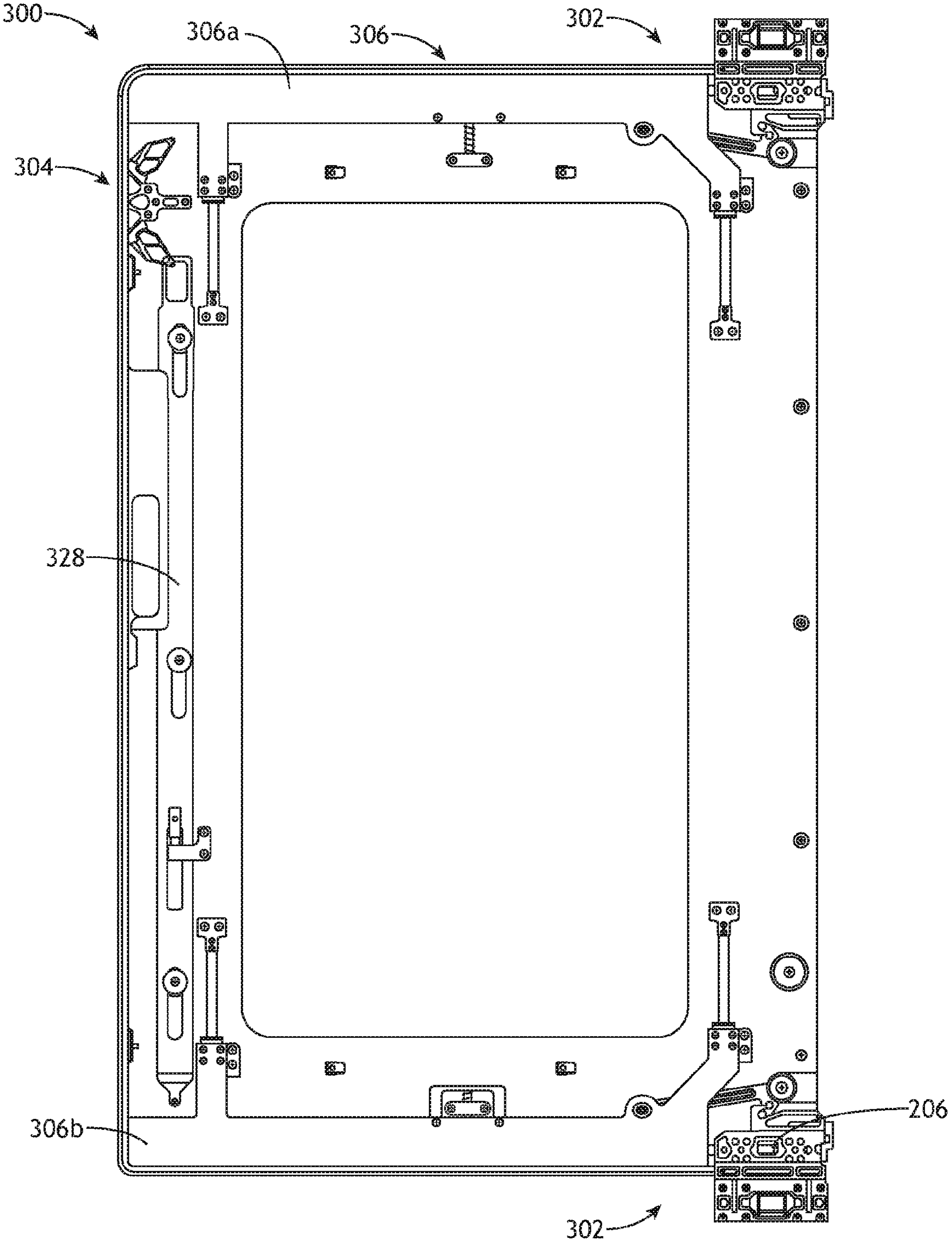
FIG. 3B is a simplified schematic rear view of an actuatable door including a redundant rail cover and indicator assembly, in accordance with one or more embodiments of the disclosure.

Referring to FIG. 3B, the cover and indicator system 300 may include a first rail cover assembly 302 corresponding to a top portion of the actuatable door 200 and a second rail cover assembly 302 corresponding to bottom portion of the actuatable door 200. For example, the first rail cover assembly 302 may correspond to a secondary rail 212 of the top portion of the actuatable door 200 and the second rail cover assembly 302 may corresponding to an additional secondary rail 212 of the bottom portion of the actuatable door 200, such that the first rail cover assembly 302 covers the secondary rail 212 of the top portion of the actuatable door 200 and the second rail cover assembly 302 may cover the additional secondary rail 212 of the bottom portion of the actuatable door 200. In this regard, in the event that a primary rail 206 (of the top and/or bottom portion) of the actuatable door 200 fails, the respective secondary rail 212 may deploy the door 200, as discussed further herein.

Figure 3C:
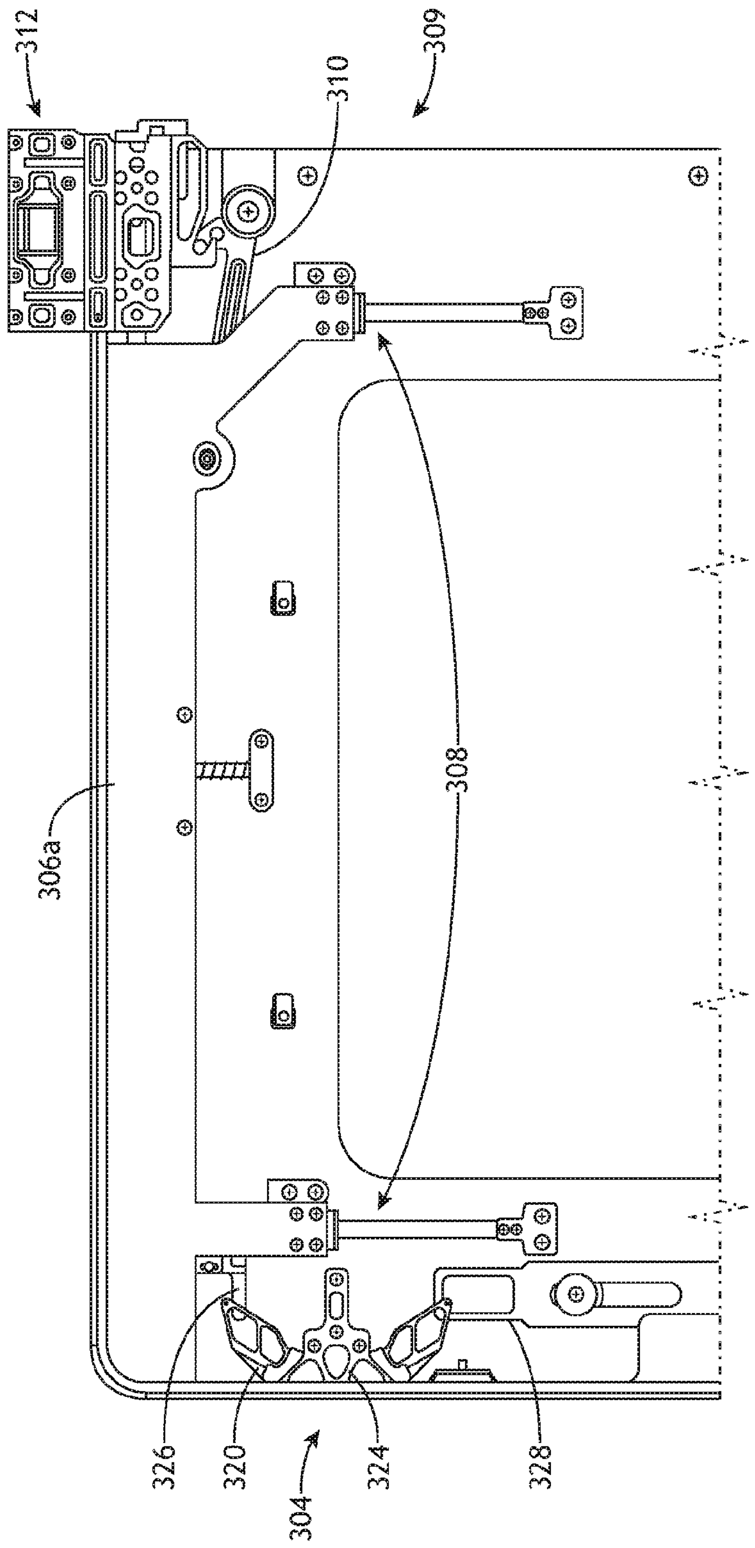
FIG. 3C is a simplified schematic detailed view of an actuatable door including a redundant rail cover and indicator assembly, in accordance with one or more embodiments of the disclosure.
Figure 3D:
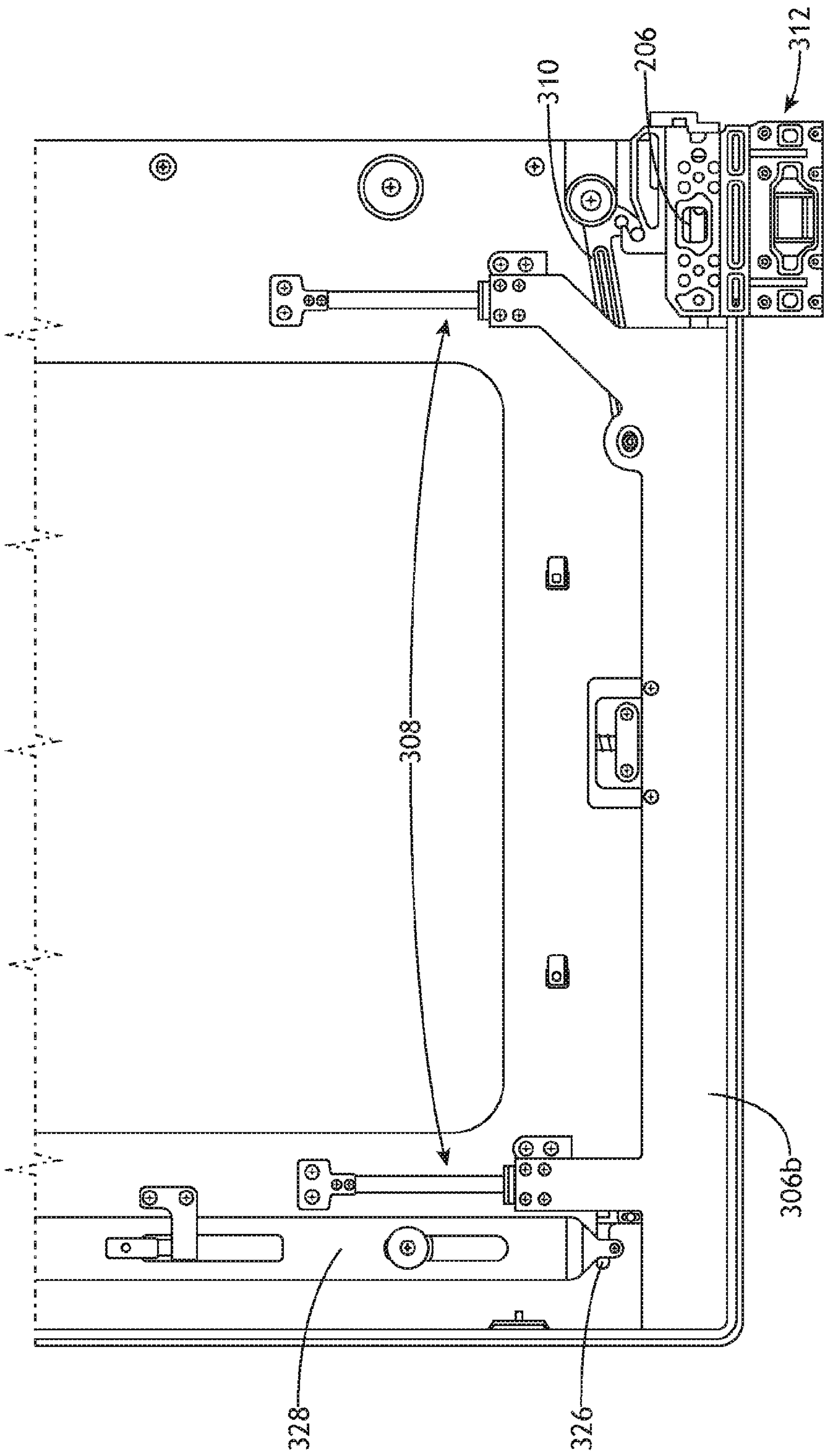
FIG. 3D is a simplified schematic detailed view of an actuatable door including a redundant rail cover and indicator assembly, in accordance with one or more embodiments of the disclosure.
Figure 3E:
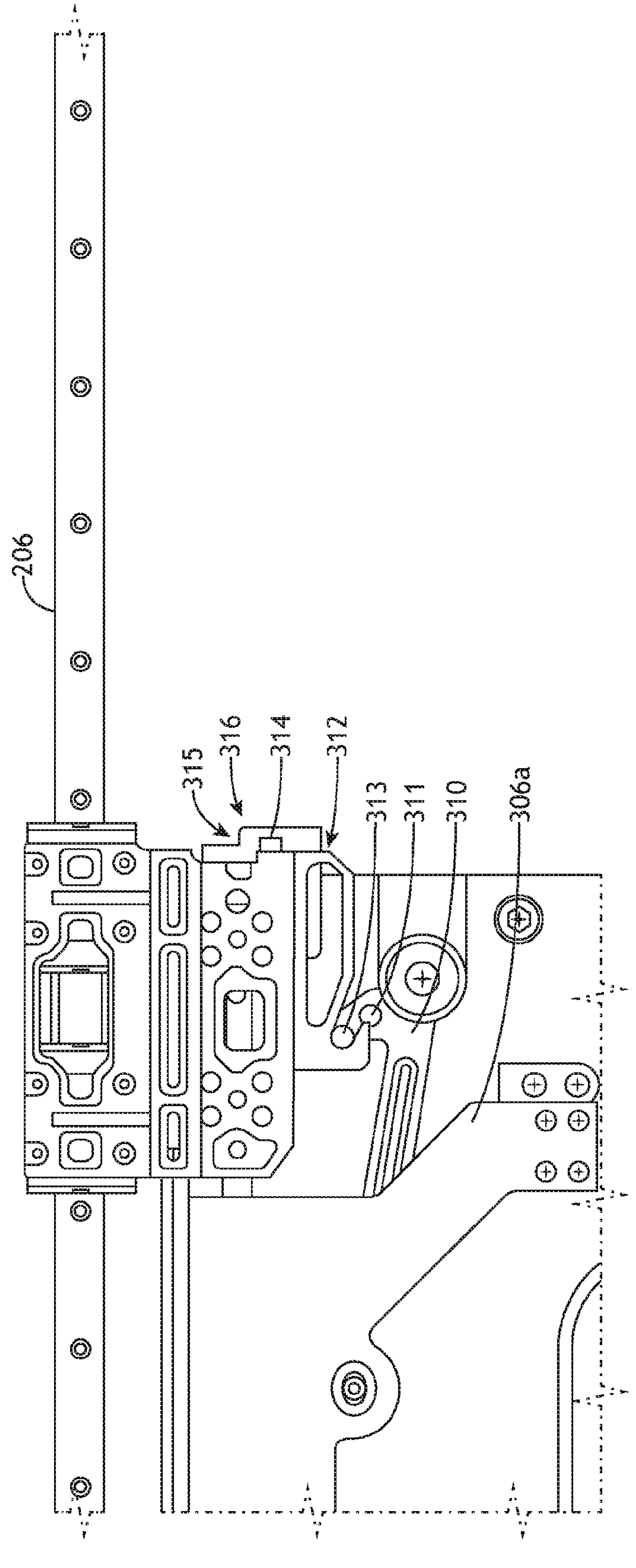
FIG. 3E is a simplified schematic detailed view of an actuatable door including a redundant rail cover and indicator assembly with a redundant rail and carriage subsystem, in accordance with one or more embodiments of the disclosure.

Each rail cover assembly 302 may include an actuatable redundant rail cover 306. For example, the rail cover assembly 302 may include an upper cover **306*a* and a lower cover 306*b*. The cover 306 may be configured to at least partially cover (or hide) the secondary rail 212 of the redundant rail and carriage assembly 200. For example, as shown in FIGS. 3B-3D, the upper cover 306*a* of the first rail cover assembly 302 may be configured to cover the secondary rail 212 of the top portion of the actuatable door 200 and the lower cover 306*b* of the second rail cover assembly 302 may be configured to cover the additional secondary rail 212 of the bottom portion of the actuatable door 200**.

It is contemplated that the cover 306 may be any configuration (e.g., size, shape, or the like) suitable for at least partially covering the secondary rail 212. FIGS. 3B-3D are provided merely for illustrative purposes and shall not be construed as limiting the scope of the present disclosure.

Each rail cover assembly 302 may include a cover actuation sub-assembly 309. The cover actuation sub-assembly 309 may be configured to actuate the actuatable redundant rail cover 306 between one of a stowed cover position and a deployed cover position in the event that the primary rail 206 (or one or more primary carriages 208) fails. For example, when in the stowed cover position, the actuatable redundant rail cover 306 may be configured to substantially cover the secondary rail 212 of the secondary rail and carriage sub-assembly 210. By way of another example, when in the deployed cover position, the actuatable redundant rail cover 306 may be configured to expose the secondary rail 212 of the secondary rail and carriage sub-assembly 210, such that the secondary rail 212 may actuate the actuatable door 200.

The cover actuation sub-assembly 309 may include one or more cover rails 308. For example, the one or more cover rails 308 may translate the cover 306 along a y-axis of the actuatable door 200. The one or more cover rails 308 may include one or more linear guides coupled to one or more linear bearings, wherein the one or more linear bearings translate along an axis of the one or more linear guides to translate the cover rails 308 along the y-axis of the actuatable door 200. It is noted that the one or more cover rails 308 may include any type of translation and/or actuation system suitable for actuating (e.g., translating and/or rotating) the cover 306 out of the way of the secondary rail 212.

The cover actuation sub-assembly 309 may include a cover arm 310. The cover arm 310 may be configured to couple to one or more portions of the cover 306, such that the cover arm 310 causes the cover 306 to translate along the y-axis of the actuatable door 200 via the one or more cover rails 308, as previously discussed above.

The cover arm 310 may engage with one or more portions of the one or more secondary carriages 214. For example, a carriage plate 312 may include (or be coupled to) the one or more primary carriages 208 and the one or more secondary carriages 214, where the carriage plate 312 may include a slot 313 configured to engage with the cover arm 310. For instance, a protrusion 311 of the cover arm 310 may engage with the slot 313, such that activation of the secondary carriage 214 (upon the primary rail 206/primary carriage 208 failing) causes the protrusion 311 of the cover arm 310 to disengage from the slot 313. In this regard, upon the protrusion 311 of the cover arm 310 disengaging from the slot 313, the cover arm 310 rotates about an axis to cause the upper cover **306*a* to translate downward along the y-axis of the actuatable door 200 to position the upper cover 306*a* in the deployed positioned. As such, the upper cover 306*a* moves out of the way of the secondary rail 212 of the top portion of the actuatable door 200, such that the secondary rail 212 of the top portion of the actuatable door 200 may translate linearly to actuate the actuatable door 200** to the deployed position.

It is contemplated herein that when the cover arm 310 is in the locked position (i.e., when the protrusion 311 of the cover arm 310 is engaged within the slot 313 of the carriage plate 312), the locked cover arm 310 prevents a passenger from pulling down the cover 306 during flight.

The cover actuation sub-assembly 309 may include a lock sub-assembly 315. The lock sub-assembly 315 may include one or more magnets 314 and one or more magnetic plates 316. For example, the lock sub-assembly 315 may prevent the redundant rail cover and indicator assembly 300 from inadvertently deploying. For instance, upon a force being applied to the lock sub-assembly 315 via the actuatable door 200, the one or more magnets 314 may disengage from the one or more magnetic plates 316 (as shown in FIG. 5C). In this regard, the force required to continue to open the door overcomes the required force of the one or more magnets 314 and the one or more magnetic plates 316, such that the there is no movement prior to overcoming the magnetic force.

The failure indicator assembly 304 may include one or more failure indicators 320. For example, as shown in FIGS. 4A-4D, the failure indicator assembly 304 may include a first failure indicator 320*a* corresponding to the top primary rail 206 and a second failure indicator 320*b* corresponding to the bottom primary rail 206. In this regard, in the event that the primary rail 206 (of the top and/or bottom portion) of the actuatable door 200 fails, the respective failure indicator 320 may visually identify which mechanism has failed (e.g., top, bottom, or both).

Figure 4B:
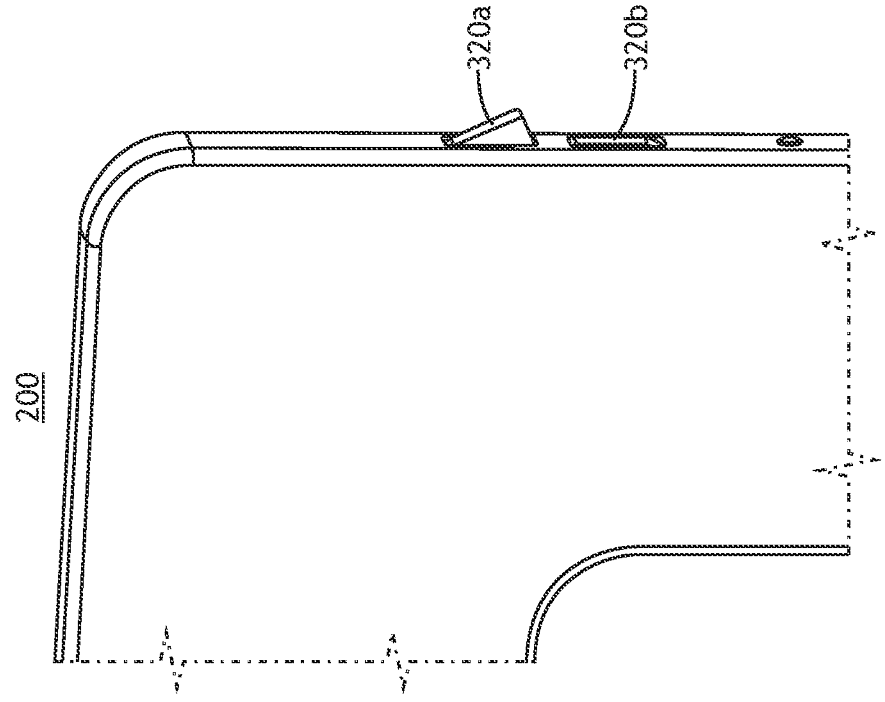
FIG. 4B is a simplified schematic detailed view of an actuatable door including a redundant rail cover and indicator assembly with a top indicator deployed, in accordance with one or more embodiments of the disclosure.
Figure 4A:
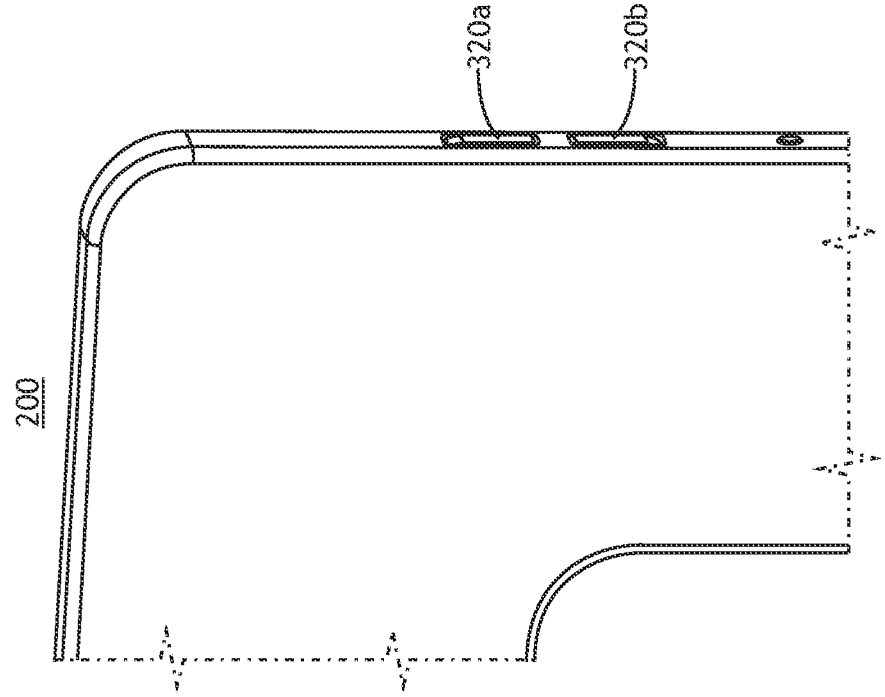
FIG. 4A is a simplified schematic detailed view of an actuatable door including a redundant rail cover and indicator assembly with no indicators deployed, in accordance with one or more embodiments of the disclosure.

Referring to FIG. 4A, when the primary rails 206 operates normally, the one or more failure indicators 320 are not visible. For example, the first failure indicator 320*a* may be enclosed within a first cavity within the actuatable door 200 and the second failure indicator 320*b* may be enclosed within a second cavity within the actuatable door 200.

Referring to FIG. 4B, when the top primary rail 206 associated with the top portion of the actuatable door 200 fails, the first indicator 320*a* may be deployed (e.g., visible). For example, the top failure indicator 320*a* may be deployed (e.g., visible) and the bottom failure indicator 320*b* may be enclosed within the cavity within the actuatable door 200. In this regard, a crew member (e.g., flight attendant, maintenance crew member, pilot, or the like) may visually identify that the top primary rail 206 has failed, such that the issue may be remedied quicker.

Figure 4D:
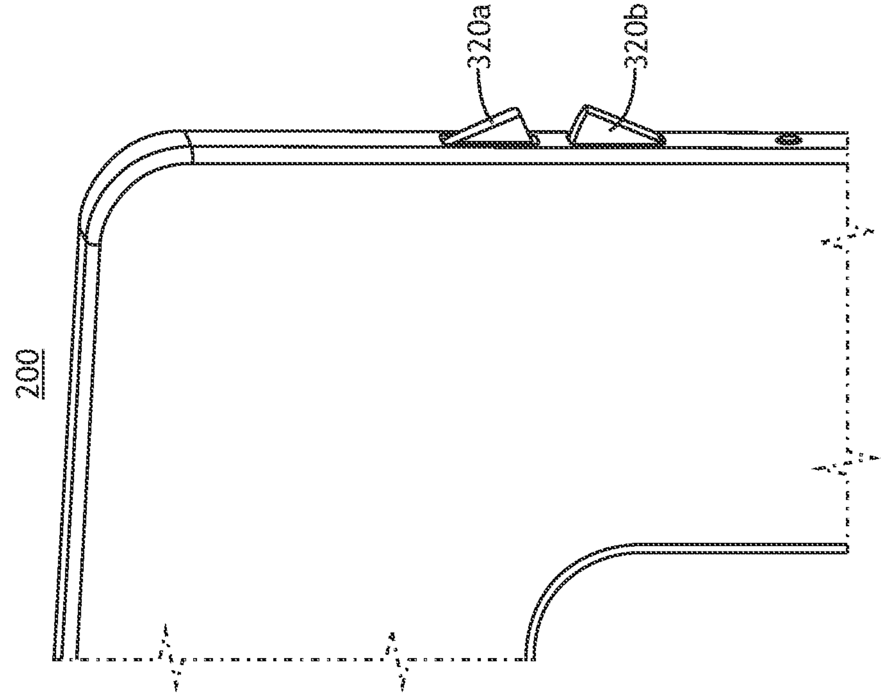
FIG. 4D is a simplified schematic detailed view of an actuatable door including a redundant rail cover and indicator assembly with top and bottom indicators deployed, in accordance with one or more embodiments of the disclosure.
Figure 4C:
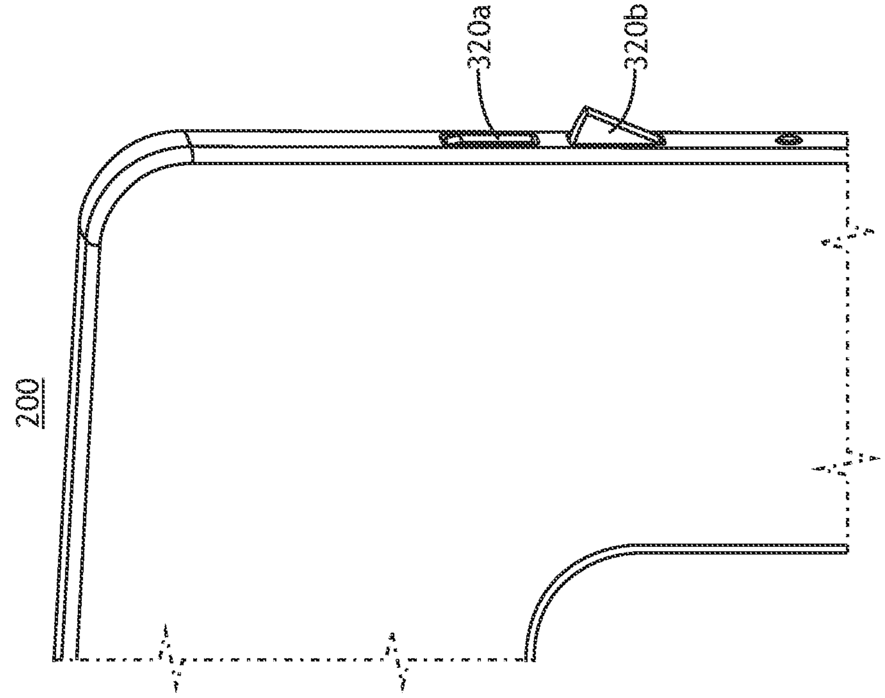
FIG. 4C is a simplified schematic detailed view of an actuatable door including a redundant rail cover and indicator assembly with a bottom indicator deployed, in accordance with one or more embodiments of the disclosure.

Referring to FIG. 4C, when the bottom primary rail 206 associated with the bottom portion of the actuatable door 200 fails, the second indicator 320*b* may be deployed (e.g., visible). For example, the bottom failure indicator 320*b* may be deployed (e.g., visible) and the top failure indicator 320*a* may be enclosed within the cavity within the actuatable door 200. In this regard, a crew member (e.g., flight attendant, maintenance crew member, pilot, or the like) may visually identify that the bottom primary rail 206 has failed, such that the issue may be remedied quicker.

Referring to FIG. 4D, when the top and bottom primary rail 206 associated with the top and bottom portion of the actuatable door 200 fails, the first and second indicators 320*a,b* may be deployed (e.g., visible). For example, the bottom failure indicator 320*b* may be deployed (e.g., visible) and the top failure indicator 320*a* may be deployed (e.g., visible). In this regard, a crew member (e.g., flight attendant, maintenance crew member, pilot, or the like) may visually identify that the top and bottom primary rails 206 have failed, such that the issue may be remedied quicker.

The one or more failure indicators 320 may include one or more color coded portions to distinguish the deployed failure indicators 320 from the actuatable door 200. For example, as shown in FIGS. 4A-4D, the side of the one or more failure indicators 320 may be a first color and the edge of the one or more failure indicators 320 may be a second color (different from the first color). In this regard, when the one or more failure indicators 320 are stowed, the one or more failure indicators 320 may blend in the frame of the actuatable door and when the one or more failure indicators 320 are deployed, the one or more failure indicators 320 may stand out from the frame of the actuatable door 200 such that the crew member may clearly identify the failure.

The failure indicator assembly 304 may include a rotational sub-assembly 322. For example, each failure indicator 320*a,b* may include a rotational sub-assembly 322. For instance, the first failure indicator 320*a* (e.g., top failure indicator 320*a*) may include a first rotational sub-assembly 322 and the second failure indicator 320*b* (e.g., bottom failure indicator 320*b*) may include a second rotational sub-assembly 322.

Each rotational sub-assembly 322 may be configured to rotate the respective failure indicator 320 between one of a stowed indicator position and a deployed indicator position. For example, the first rotational sub-assembly 322 may be configured to rotate the first failure indicator 320*a* (e.g., top failure indicator 320*a*) between the stowed and deployed indicator position. By way of another example, the second rotational sub-assembly 322 may be configured to rotate the second failure indicator 320*b* (e.g., bottom failure indicator 320*b*) between the stowed and deployed indicator position. In this regard, when the respective primary rail and carriage sub-assembly 204 fails, the respective rotational sub-assembly 322 may be configured to cause the one or more failure indicators 320 to rotate between the stowed indicator position and the deployed indicator position. In one instance, when the top primary rail and carriage sub-assembly 204 fails, the first rotational sub-assembly 322 may be configured to rotate the first failure indicator 320*a* (e.g., top failure indicator 320*a*) between the stowed and deployed indicator position. In another instance, when the bottom primary rail and carriage sub-assembly 204 fails, the second rotational sub-assembly 322 may be configured to rotate the second failure indicator 320*b* (e.g., bottom failure indicator 320*b*) between the stowed and deployed indicator position.

Figure 3F:
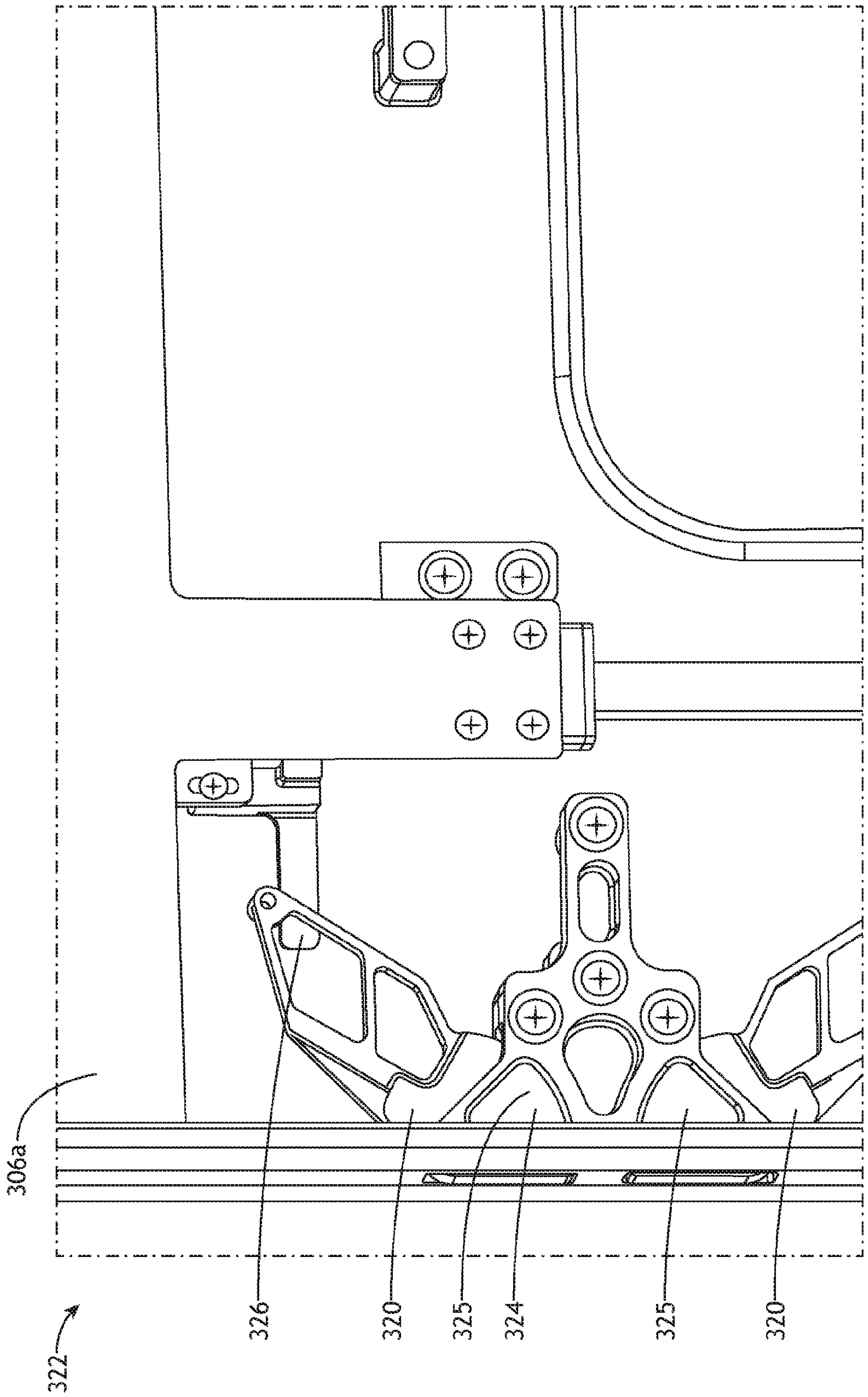
FIG. 3F is a simplified schematic detailed view of an indicator sub-assembly of the redundant rail cover and indicator assembly, in accordance with one or more embodiments of the disclosure.
Figure 3G:
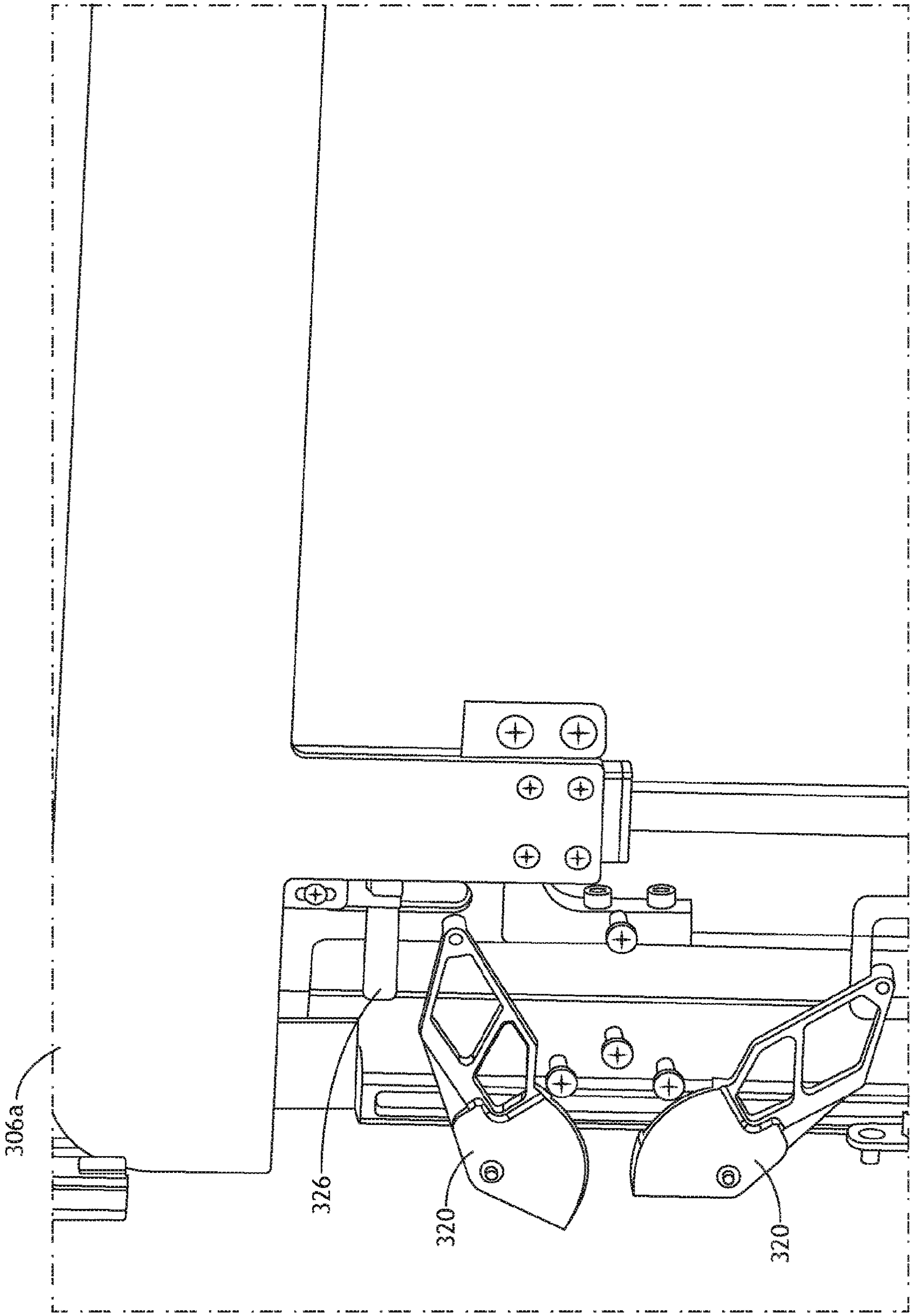
FIG. 3G is a simplified schematic detailed view of an indicator sub-assembly of the redundant rail cover and indicator assembly, in accordance with one or more embodiments of the disclosure.

The failure indicator assembly 304 may include a casing 324. The casing 324 may be configured to couple the one or more failure indicators 320 to the actuatable door 200. For example, the casing 324 may include one or more cavities 325 to house one or more portions of the one or more failure indicators 320, where the one or more indicators 320 may be enclosed by the one or more cavities 325 when in the stowed indicator position (as shown in FIG. 3F). By way of another example, the one or more indicators 320 may be deployed from the one or more cavities 325 by rotating about a rotational axis out of the one or more cavities 325, as discussed further herein.

The rotational sub-assembly 322 may include one or more levers 326 and one or more linkage bars 328. For example, the one or more levers 326 may couple the one or more failure indicators 320 to the cover 306. For instance, upon deploying the cover assembly 302, the cover 306 may translate via the one or more cover rails 308 to cause the one or more levers 326 to translate. Upon translating the one or more levers 326, the one or more failure indicators 320 may be rotated about a rotational axis to the deployed position. By way of another example, as shown in FIGS. 3B-3D, the one or more levers 326 may couple the one or more failure indicators 320 to the cover 306 via the one or more linkage bars 328, where the one or more linkage bars 328 coupled to the one or more indicators 320. For instance, upon deploying the cover assembly 302, the cover 306 may translate via the one or more cover rails 308 to cause the one or more levers 326 to translate. Upon translating the one or more levers 326, the one or more linkage bars 328 may translate to cause the one or more failure indicators 320 to be rotated about a rotational axis to the deployed position.

Although FIGS. 3B-3D depict the one or more linkage bars 328 coupled to the second indicator 320*b* (e.g., bottom indicator 320*b*), it is noted that the one or more failure indicators 320 may be placed in any configuration on the actuatable door 200, such that the one or more linkage bars

328 may be coupled to any of the one or more indicators 320. For example, where the one or more indicators 320 are arranged in the center of the actuatable door 200, a first linkage bar 328 may be coupled to the first indicator 320*a* (e.g., top indicator 320*a*) and an additional linkage bar 328 may be coupled to the second indicator 320*b* (e.g., bottom indicator 320*b*). In this regard, the respective cover 306 may translate the respective linkage bar 328 which in turn causes the respective lever 326 to deploy the respective indicator 320*a,b*. By way of another example, where the one or more indicators 320 are arranged at the bottom of the actuatable door 200, the one or more linkage bars 328 may be coupled to the first indicator 320*a* (e.g., top indicator 320*a*).

Figure 3H:
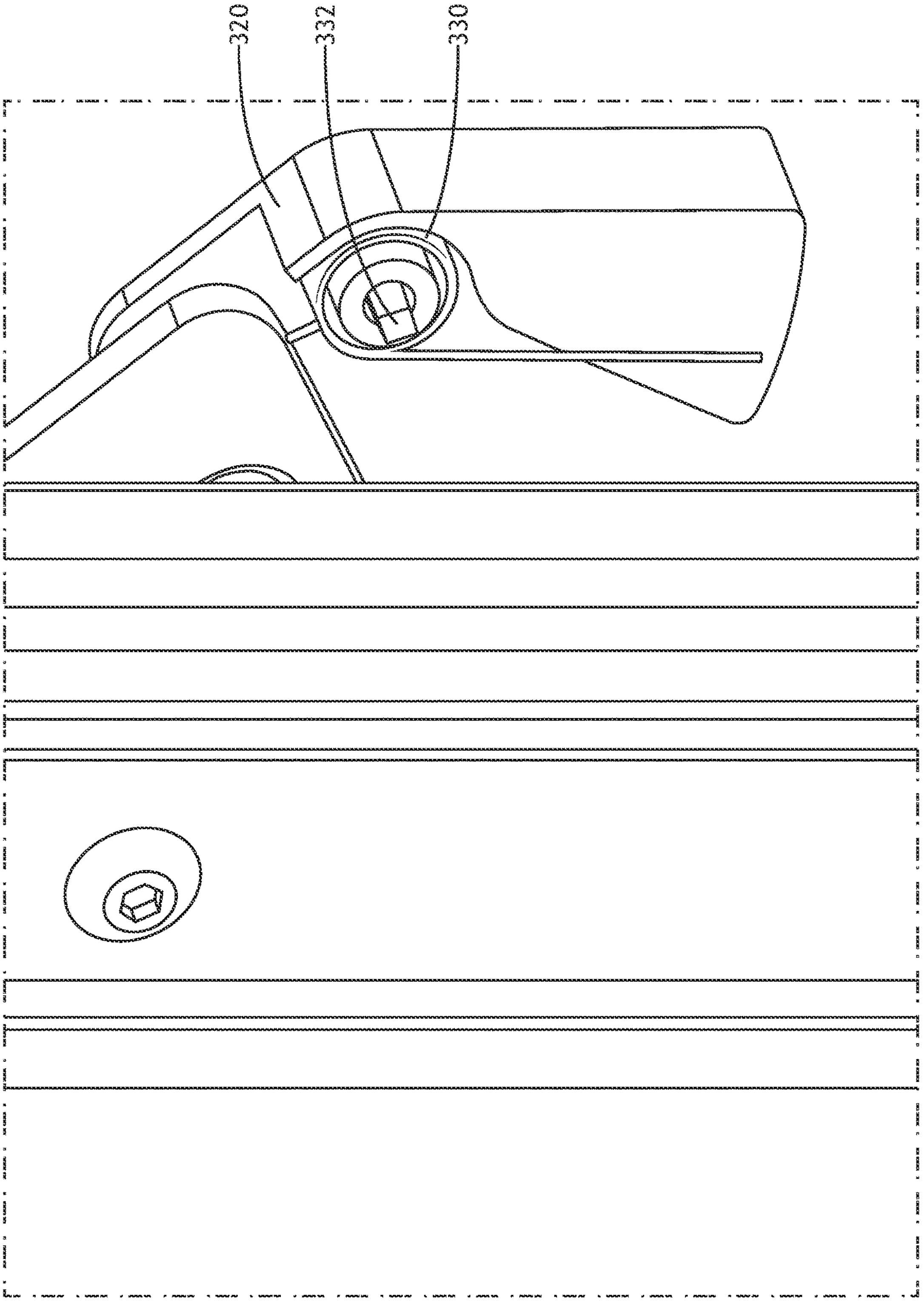
FIG. 3H is a simplified schematic detailed view of an indicator sub-assembly of the redundant rail cover and indicator assembly, in accordance with one or more embodiments of the disclosure.

Referring to FIG. 3H, the rotational sub-assembly 322 may include one or more springs 330 and one or more pins 332. For example, the respective cover 306 may translate to cause the respective failure indicator 320 to rotate about the pin 332 via the spring 330. When the respective cover 306 returns to the stowed (upright position), the spring 330 may retract the one or more failure indicators 320, such that the return to the stowed position (within the casing 324).

It is contemplated that the actuation of the cover assembly 302 is independent from the actuation of the indicator assembly 304, such that issues with one assembly do not prevent the system 300 from working properly.

FIGS. 5A-5E are schematic views of the redundant rail cover and indicator assembly 300 is actuating between a stowed (or natural) position and a deployed position, while assuming one or more intermediate positions, in accordance with one or more embodiment of the present disclosure.

Figure 5A:
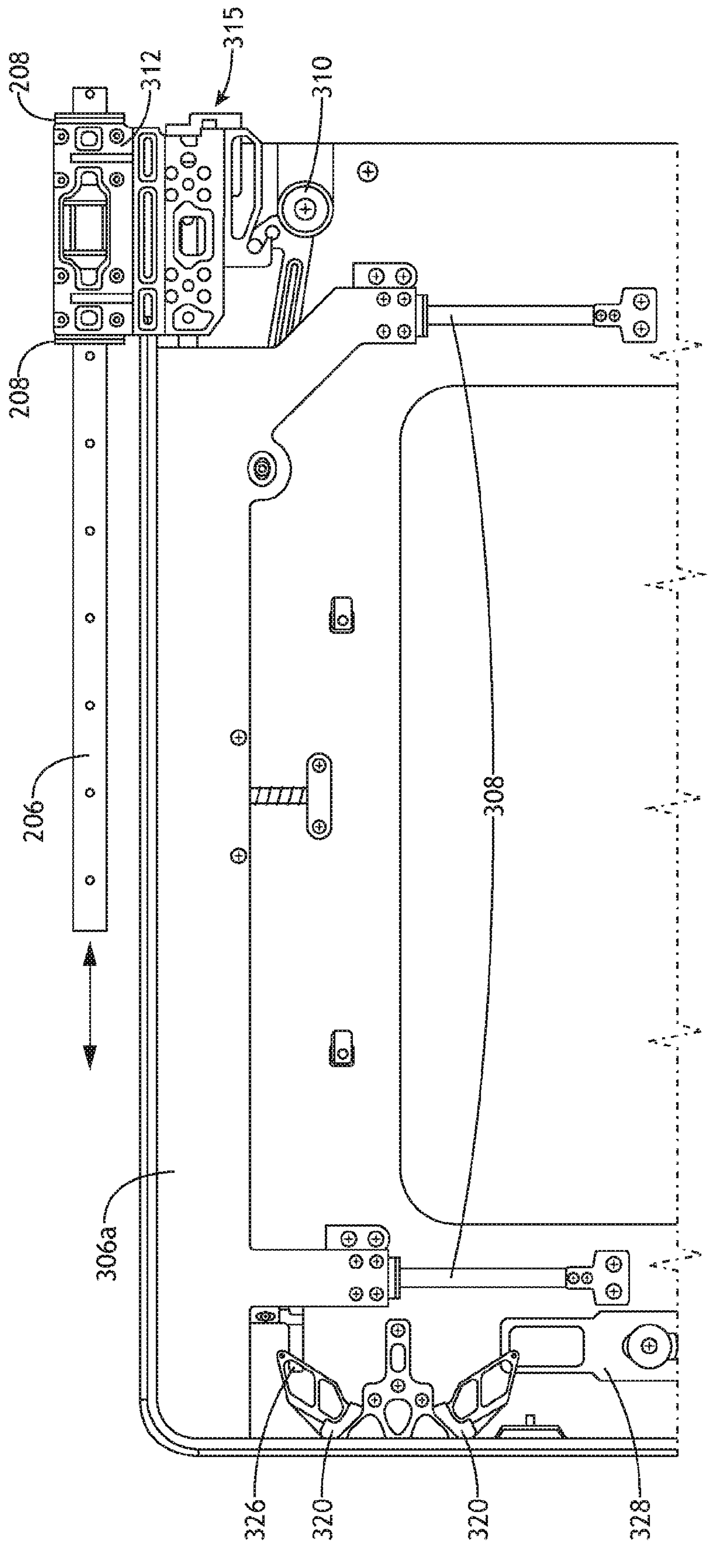
FIG. 5A is a simplified schematic view of an actuatable door when the redundant rail cover and indicator assembly is in the stowed (or natural) position, in accordance with one or more embodiments of the disclosure.

Referring to FIG. 5A, in the stowed (or natural) position, the primary rail 206 and the one or more primary carriages 208 actuate the door between the stowed and deployed door position. In the event that the primary rail 206 or one or more primary carriages 208 fails, the secondary rail 212 and one or more secondary carriages 214 may be deployed to actuate the door 200 between the stowed and deployed door position. For example, when in the stowed cover position, the upper cover 306*a* may be configured to substantially cover the secondary rail 212 of the secondary rail and carriage sub-assembly 210 on the top portion of the actuatable door 200. By way of another example, when in the deployed cover position, the upper cover 306*a* may be configured to expose the secondary rail 212 of the secondary rail and carriage sub-assembly 210 on the top portion of the actuatable door 200 such that the secondary rail 212 may actuate the actuatable door 200.

Figure 5B:
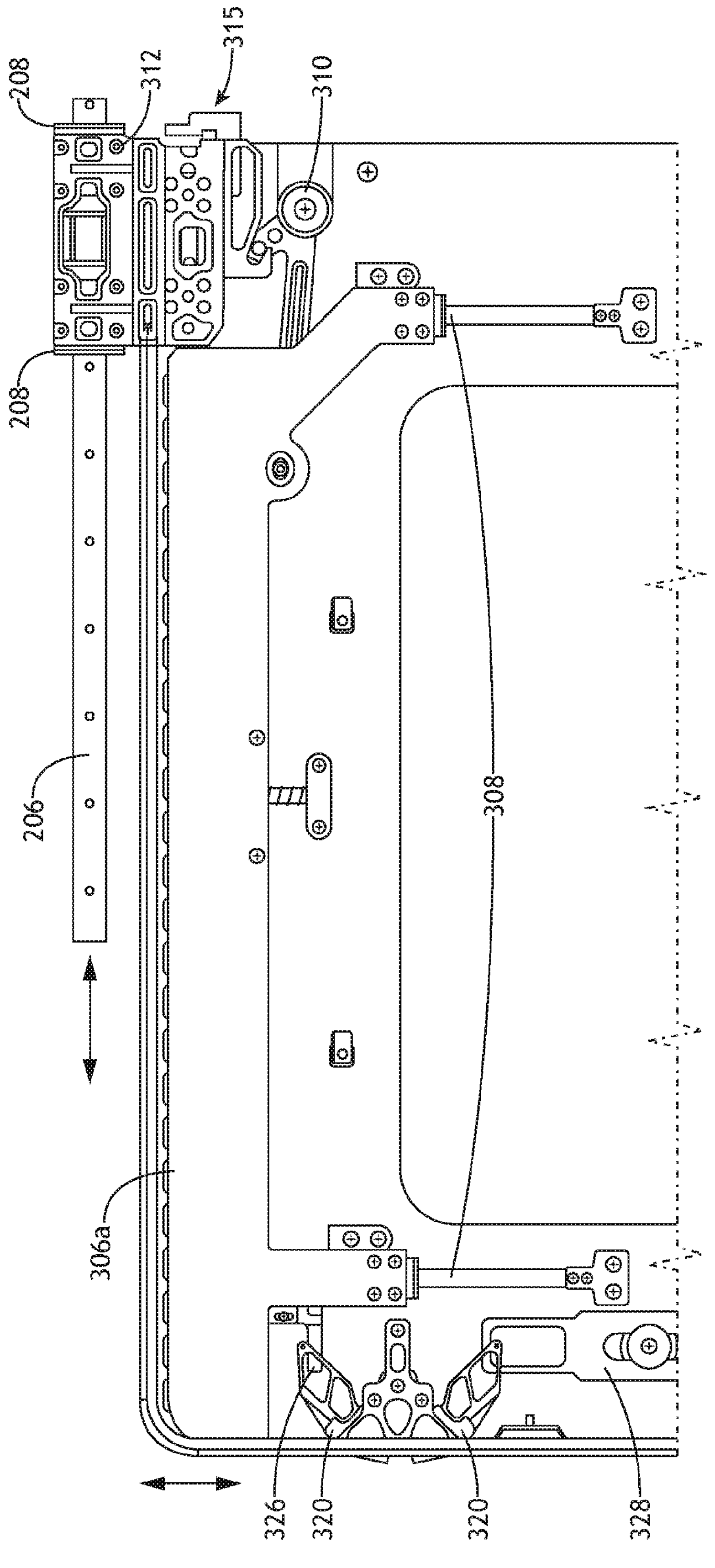
FIG. 5B is a simplified schematic view of an actuatable door when the redundant rail cover and indicator assembly is in an intermediate position, in accordance with one or more embodiments of the disclosure.
Figure 5C:
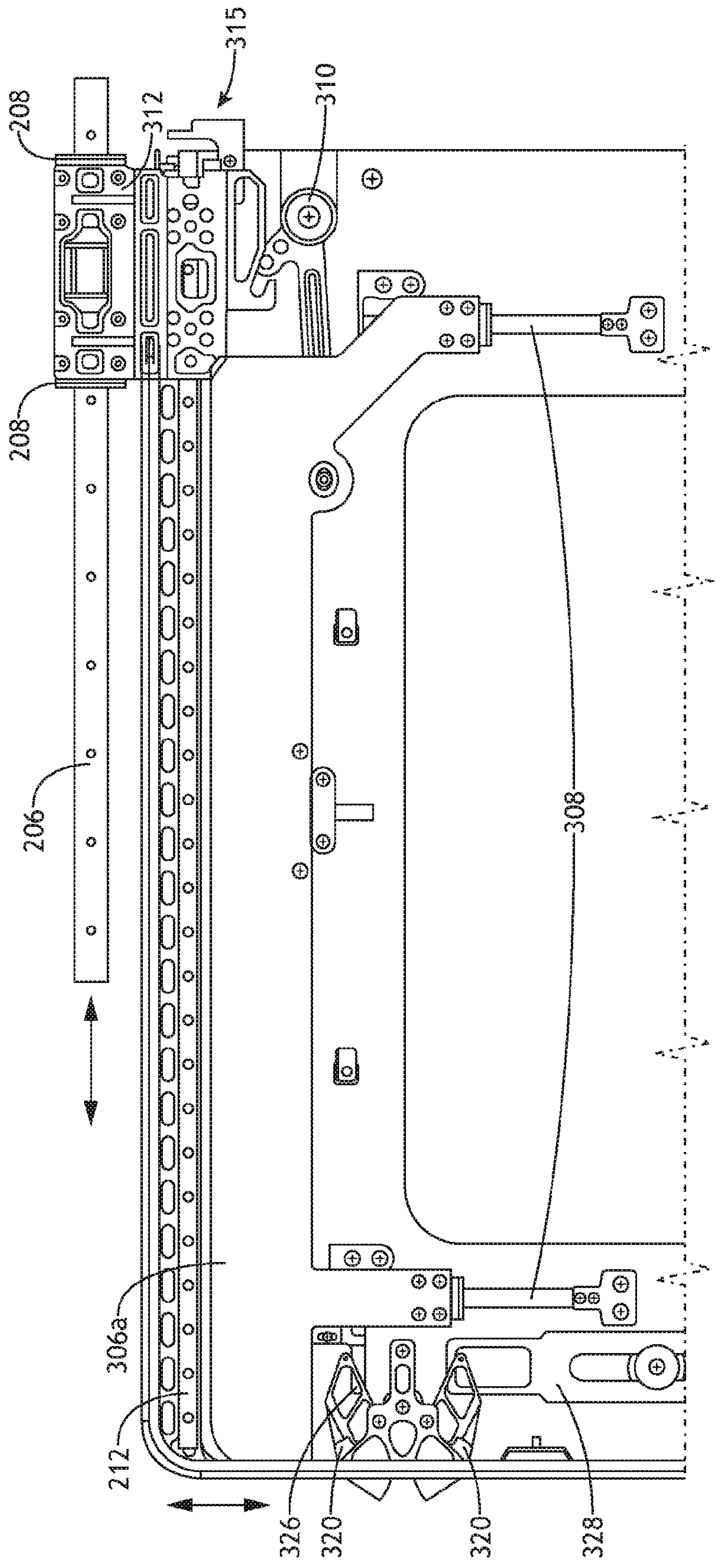
FIG. 5C is a simplified schematic view of an actuatable door when the redundant rail cover and indicator assembly is in an intermediate position, in accordance with one or more embodiments of the disclosure.

Referring to FIGS. 5B-5C, upon overcoming the force of the one or more magnets 314 and magnetic plates 316, the upper cover 306*a* may be actuated. For example, as shown in FIG. 5B, upon a force being applied to the lock sub-assembly 315 via the actuatable door 200, the one or more magnets 314 may disengage from the one or more magnetic plates 316 (as shown in FIG. 5C). In this regard, the force required to continue to open the door overcomes the required force of the one or more magnets 314 and the one or more magnetic plates 315, such that the there is no movement prior to overcoming the magnetic force.

Once the magnetic force has been overcome, the protrusion 311 of the cover arm 310 may disengage from the slot 313 within the carriage plate 312. Upon disengaging the protrusion 311 of the cover arm 310 from the slot 313 of the carriage plate 312, the cover arm 310 may rotate about a rotational axis to cause the upper cover 306*a* to translate downwards via the one or more cover rails 308. In this regard, the upper cover 306*a* is moved out of the way of the secondary rail 212 on the top portion of the actuatable door 200, such that it does not impede the operation of the secondary rail 212.

Figure 5D:
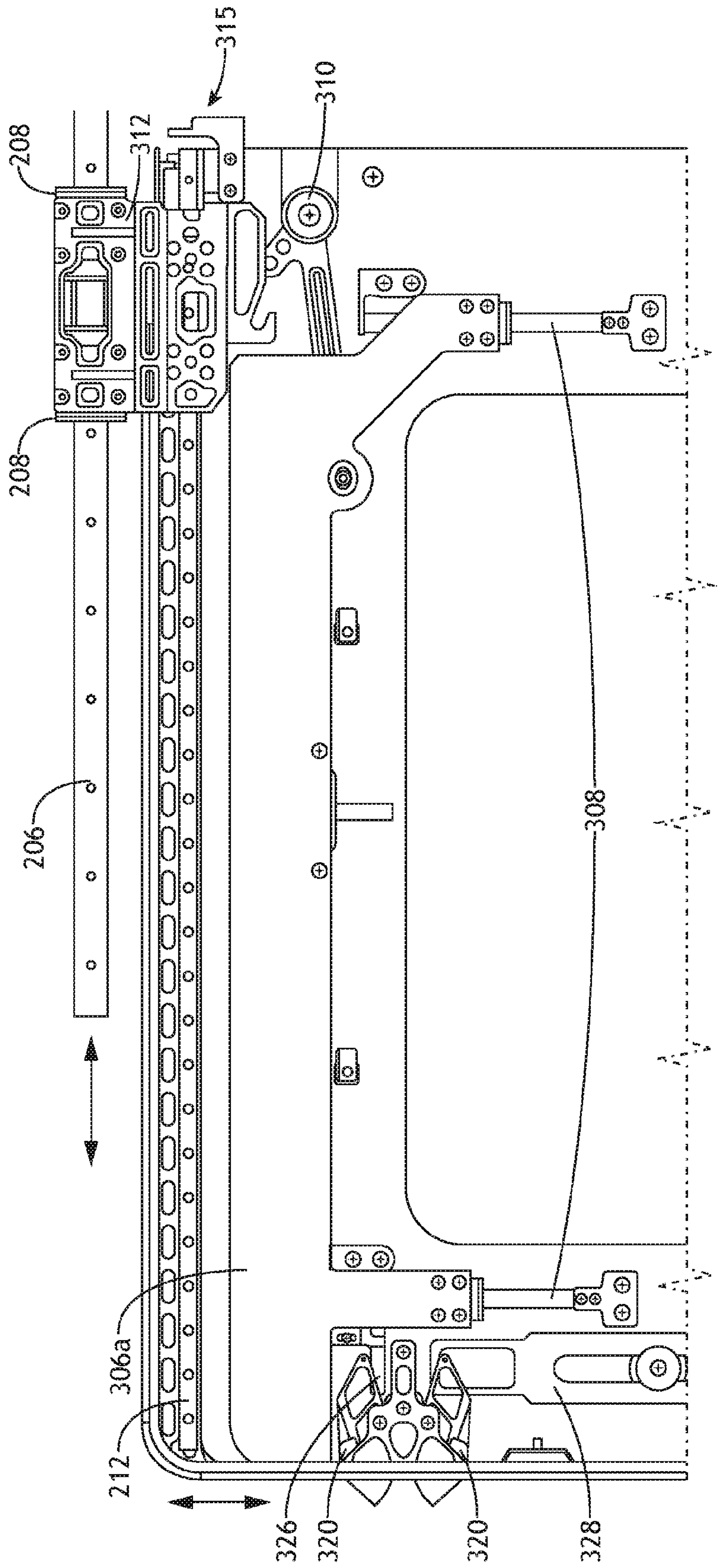
FIG. 5D is a simplified schematic view of an actuatable door when the redundant rail cover and indicator assembly is in a deployed position, in accordance with one or more embodiments of the disclosure.
Figure 5E:
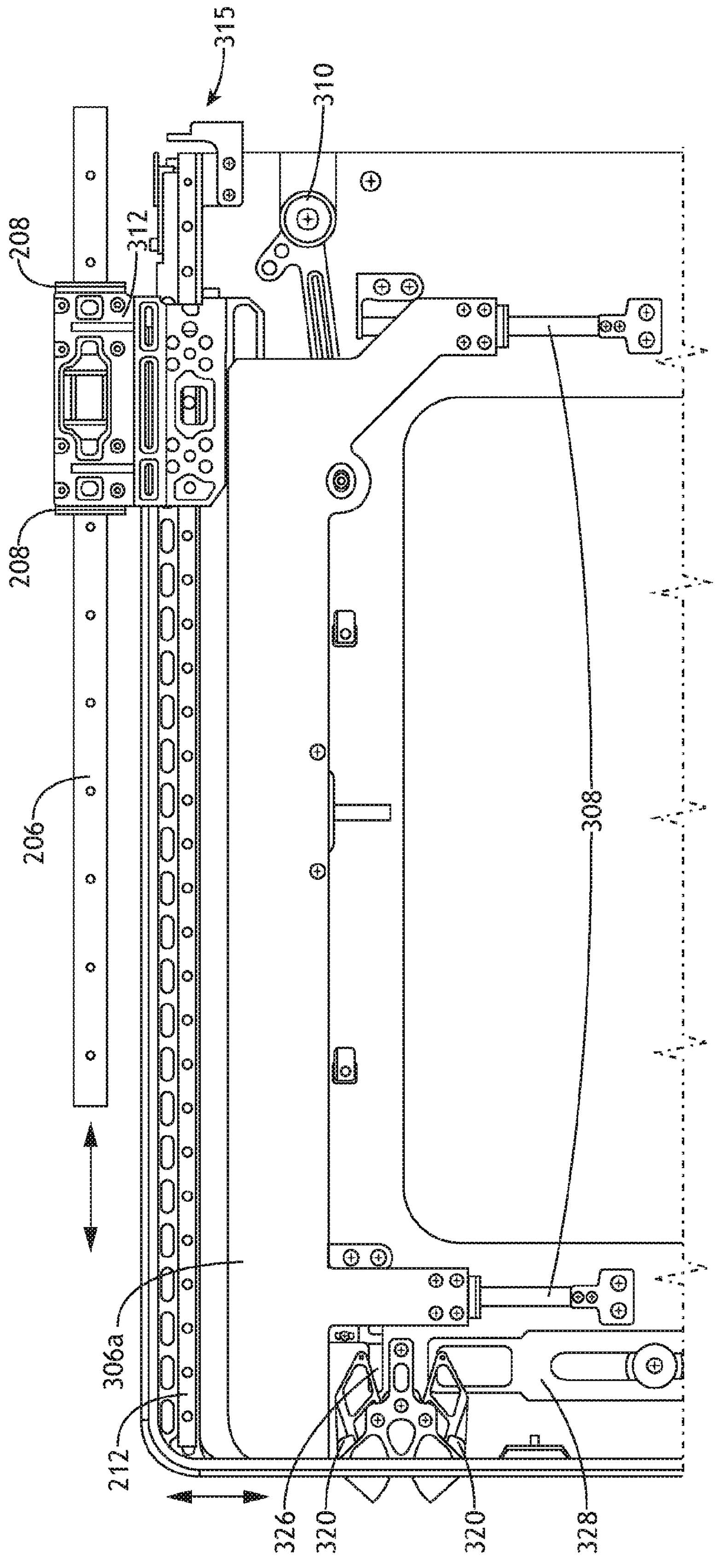
FIG. 5E is a simplified schematic view of an actuatable door when the redundant rail cover and indicator assembly is in a deployed position, in accordance with one or more embodiments of the disclosure.

Referring to FIGS. 5D-5E, once the upper cover 306*a* has translated downward and the upper cover 306*a* has cleared the one or more secondary carriages 214, the one or more secondary carriages 214 may linearly translate along an axis of the secondary rail 212 on the top portion of the actuatable door 200. As shown in FIG. 5E, the bottom of the carriage plate 312 may be in contact with the upper cover 306*a* may translating along the secondary rail 212, where the cover arm 310 is moved past the carriage plate 312 and out of contact.

The one or more indicators 320*a,b* remain in the stowed position (as shown in FIG. 5A), until the magnetic force has been overcome. Once the upper cover 306*a* translates, the one or more failure indicators 320*a,b* begins rotating to the deployed position (as shown in FIG. 5B). Once the protrusion 311 has disengaged from the slot 313 of the carriage plate 312 to cause the upper cover 306*a* to translate downwards, the one or more secondary carriages 214 may translate along the secondary rail 212 such that the one or more failure indicators 320 may become fully present.

Although embodiments of the disclosure illustrate the actuatable door 200 being stowed in a specific location, the stowed door position may be anywhere within the passenger suite 102 that would still allow for a deployed position within the opening 126.

It is noted the door 200 may be manually actuated. In addition, it is noted the door 200 may be electrically-actuated via a motor (e.g., a servo motor, or the like) coupled to a controller. For example, the controller may include one or more processors and memory, where the memory is configured to store a set of program instructions, where the set of program instructions are configured to cause the one or more processors to perform one or more actions with respect to actuations of the actuatable door 200. A user input device and/or a display may be installed within the passenger suite 102 or coupled to an exterior surface of the passenger suite 102, and the controller is configured to receive commands (e.g., to deploy the actuatable door 200, or stow the actuatable door 200) from the user input device and/or the display.

Although embodiments of the disclosure illustrate the actuatable door 200 being installed and actuatable within the boundaries of the passenger suite 102, it is noted the actuatable door 200 may be coupled to an exterior surface of the passenger suite 102 and actuatable between the door stowed position and the door deployed position outside of the passenger suite 102 (e.g., in the aircraft aisle 128). Therefore, the above description should not be interpreted as a limitation on the scope of the disclosure but merely an illustration.

Although embodiments of the disclosure are directed to an aviation environment such as an aircraft cabin 100, it is noted the actuatable door 200 is not limited to the aviation environment and/or the aircraft components within the aviation environment. For example, the actuatable door 200 may be configured for any type of vehicle known in the art. For example, the vehicle may be any air, space, land, or water-based personal equipment or vehicle; any air, space, land, or water-based commercial equipment or vehicle; any air, space, land, or water-based military equipment or vehicle known in the art. By way of another example, the actuatable door 200 may be configured for commercial or industrial use in either a home or a business. Therefore, the above description should not be interpreted as a limitation on the present disclosure but merely an illustration.

Further, although embodiments of the disclosure are directed to an actuatable door 200, it is noted that redundant rail and carriage assembly 202 is not limited to actuating a door 200.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An actuatable door for an aircraft passenger suite installed within an aircraft cabin, comprising:

one or more redundant rail and carriage assemblies, the one or more redundant rail and carriage assemblies coupled to a portion of the actuatable door, the one or more redundant rail and carriage assemblies including a primary rail and carriage sub-assembly including a primary rail and a primary carriage and a secondary rail and carriage sub-assembly including a secondary rail and a secondary carriage, the secondary rail being different than the primary rail, the secondary carriage being different than the primary carriage, the secondary rail and carriage sub-assembly being configured to actuate the actuatable door via the secondary rail and the secondary carriage if one of the primary rail or the primary carriage of the primary rail and carriage sub-assembly fails; and one or more rail and carriage failure indicator assemblies, each rail and carriage indicator assembly comprising:

a failure indicator, the failure indicator configured to visually identify when the primary rail and carriage sub-assembly fails;

a rotational sub-assembly, the rotational sub-assembly configured to rotate the failure indicator between one of a stowed indicator position and a deployed indicator position, when the primary rail and carriage sub-assembly fails, the rotational sub-assembly is configured to cause the failure indicator to rotate between the stowed indicator position and the deployed indicator position; and one or more redundant rail cover assemblies, each redundant rail cover assembly corresponding to the secondary rail and carriage sub-assembly, each redundant rail cover assembly comprising:

an actuatable redundant rail cover; and a cover actuation sub-assembly, the cover actuation sub-assembly configured to actuate the actuatable redundant rail cover between one of a stowed cover position and a deployed cover position, when in the stowed cover position, the actuatable redundant rail cover is configured to substantially cover the secondary rail of the secondary rail and carriage sub-assembly, when the primary rail and carriage sub-assembly fails, the cover actuation sub-assembly is configured to cause the actuatable redundant rail cover to actuate between the stowed cover position and the deployed cover position.

2. The actuatable door of claim 1, wherein the one or more redundant rail and carriage assemblies comprises:

a top primary rail and carriage sub-assembly coupled to a top portion of a suite wall;

a bottom primary rail and carriage sub-assembly a bottom portion of a suite wall;

a top secondary rail and carriage sub-assembly coupled to the top portion of the actuatable door; and a bottom secondary rail and carriage sub-assembly the bottom portion of the actuatable door.

3. The actuatable door of claim 2, wherein the one or more rail and carriage failure indicator assemblies comprises:

a first indicator associated with the top primary rail and carriage sub-assembly and the top secondary rail and carriage sub-assembly, wherein the first indicator is rotated between the stowed indicator position and the deployed indicator position when one of the primary rail or the primary carriage of the top primary rail and carriage sub-assembly fails; and a second indicator associated with the bottom primary rail and carriage sub-assembly and the bottom secondary rail and carriage sub-assembly, wherein the second indicator is rotated between the stowed indicator position and the deployed indicator position when one of the primary rail or the primary carriage of the bottom primary rail and carriage sub-assembly fails.

4. The actuatable door of claim 1, wherein the rotational sub-assembly of the rail and carriage failure indicator assembly comprises:

a lever, wherein the lever couples the failure indicator to the actuatable redundant rail cover.

5. The actuatable door of claim 1, wherein the rotational sub-assembly of the rail and carriage failure indicator assembly comprises:

a spring and a pin, wherein the failure indicator rotates about an axis of the pin when rotating between the stowed indicator position and the deployed indicator position.

6. The actuatable door of claim 1, wherein the cover actuation sub-assembly of the redundant rail cover assembly comprises:

a cover arm; and a carriage plate.

7. The actuatable door of claim 6, wherein the cover arm includes a protrusion configured to engage with a slot of the carriage plate, upon one of the primary rail or the primary carriage failing, the protrusion of the cover arm is configured to disengage from the slot of the carriage plate.

8. The actuatable door of claim 7, wherein the cover actuation sub-assembly of the redundant rail cover assembly further comprises:

one or more cover rails.

9. The actuatable door of claim 8, wherein upon the protrusion of the cover arm disengaging from the slot of the carriage plate, the cover arm is configured to rotate to cause the actuatable redundant rail cover to translate via the one or more cover rails.

10. The actuatable door of claim 1, wherein the cover actuation sub-assembly of the redundant rail cover assembly further comprises:

one or more magnets and one or more magnetic plates, wherein a magnetic force of the one or more magnets and the one or more magnetic plates is configured to be overcome upon a force applied to the actuatable door when actuating the actuatable door between one of a stowed actuatable door position and a deployed actuatable door position.

11. A redundant rail cover and indicator system, the system comprising:

one or more rail and carriage failure indicator assemblies, each rail and carriage failure indicator assembly comprising:

a failure indicator, the failure indicator configured to visually identify when a primary rail and carriage sub-assembly fails;

a rotational sub-assembly, the rotational sub-assembly configured to rotate the failure indicator between one of a stowed indicator position and a deployed indicator position, when the primary rail and carriage sub-assembly fails, the rotational sub-assembly is configured to cause the failure indicator to rotate between the stowed indicator position and the deployed indicator position; and one or more redundant rail cover assemblies, each redundant rail cover assembly corresponding to a secondary rail and carriage sub-assembly, each redundant rail cover assembly comprising:

an actuatable redundant rail cover; and a cover actuation sub-assembly, the cover actuation sub-assembly configured to actuate the actuatable redundant rail cover between one of a stowed cover position and a deployed cover position, when in the stowed cover position, the actuatable redundant rail cover is configured to substantially cover the secondary rail of the secondary rail and carriage sub-assembly, when the primary rail and carriage sub-assembly fails, the cover actuation sub-assembly is configured to cause the actuatable redundant rail cover to actuate between the stowed cover position and the deployed cover position.

12. The redundant rail cover and indicator system of claim 11, wherein the rotational sub-assembly of the rail and carriage failure indicator assembly comprises:

a spring and a pin, wherein the failure indicator rotates about an axis of the pin when rotating between the stowed indicator position and the deployed indicator position.

13. The redundant rail cover and indicator system of claim 12, wherein the cover actuation sub-assembly of the redundant rail cover assembly comprises:

a cover arm; and a carriage plate, wherein the cover arm includes a protrusion configured to engage with a slot of the carriage plate, upon one of the one of a primary rail or a primary carriage of the primary rail and carriage sub-assembly failing, the protrusion of the cover arm is configured to disengage from the slot of the carriage plate.

14. The redundant rail cover and indicator system of claim 13, wherein the cover actuation sub-assembly of the redundant rail cover assembly further comprises:

one or more cover rails, wherein upon the protrusion of the cover arm disengaging from the slot of the carriage plate, the cover arm is configured to rotate to cause the cover to translate via the one or more cover rails.

15. The redundant rail cover and indicator system of claim 11, wherein the rotational sub-assembly of the rail and carriage failure indicator assembly comprises:

a lever, wherein the lever couples the failure indicator to the actuatable redundant rail cover, wherein upon the actuatable redundant rail cover translating via the one or more cover rails between one of the stowed cover position and the deployed cover position, the lever is configured to translate to cause the failure indicator to rotate between one of the stowed indicator position and the deployed indicator position.

* * * * *